United States Patent
Liu et al.

(10) Patent No.: US 11,113,380 B2
(45) Date of Patent: Sep. 7, 2021

(54) SECURE GRAPHICS

(71) Applicant: IRDETO B.V., Hoofddorp (NL)

(72) Inventors: Annie Liu, Ottawa (CA); Wim Mooij, Hoofddorp (NL); Sunitha Ramakrishna, Hoofddorp (NL); Catherine Chambers, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 319 days.

(21) Appl. No.: 16/310,245

(22) PCT Filed: Jul. 15, 2016

(86) PCT No.: PCT/EP2016/066973
§ 371 (c)(1),
(2) Date: Dec. 14, 2018

(87) PCT Pub. No.: WO2018/010823
PCT Pub. Date: Jan. 18, 2018

(65) Prior Publication Data
US 2019/0332760 A1    Oct. 31, 2019

(51) Int. Cl.
*G06F 21/36* (2013.01)
*G06F 9/451* (2018.01)
(Continued)

(52) U.S. Cl.
CPC ............ *G06F 21/36* (2013.01); *G06F 3/0482* (2013.01); *G06F 9/451* (2018.02); *G06F 16/743* (2019.01); *G06F 21/602* (2013.01)

(58) Field of Classification Search
CPC ........ G06F 21/36; G06F 21/602; G06F 9/451; G06F 16/743; G06F 3/0482
See application file for complete search history.

(56) References Cited

U.S. PATENT DOCUMENTS

2011/0060993 A1\* 3/2011 Cotter ................. G11B 27/034
715/720
2020/0241734 A1\* 7/2020 Soni ..................... H04N 21/854

FOREIGN PATENT DOCUMENTS

EP    1795998 A1    6/2007
WO    9719398 A1    5/1997

OTHER PUBLICATIONS

International Search Report and Written Opinion for International Application No. PCT/EP2016/066973.

\* cited by examiner

*Primary Examiner* — Hee K Song
(74) *Attorney, Agent, or Firm* — Rimon PC; Marc Kaufman

(57) ABSTRACT

There are described computer-implemented methods of obtaining a user input. A first such method comprises: (a) providing access to video content, the video content representing a user interface including a plurality of elements for selection by a user; (b) playing a first portion of the video content to the user; (c) detecting a first user interaction occurring in response to the played first portion of the video content; and (d) determining a first element selected by the user based on one or more properties of the detected first user interaction. A second such method comprises: (a) providing access to one or more frames of pre-generated video content encoded in compressed video format; (b) displaying to a user initial video content encoded in compressed video format, the initial video content being based on one or more frames of the pre-generated video content, and the initial video content representing a plurality of graphical elements for selection by a user; (c) detecting a first user interaction occurring in response to the displayed initial video content; (d) determining a first graphical element selected by the user based on one or more properties (Continued)

of the detected first user interaction; (e) in response to the first user interaction, generating new video content encoded in compressed video format based on one or more frames of the pre-generated video content and the one or more properties of the first user interaction; and (f) displaying the new video content to the user.

There are also described corresponding apparatuses, computer programs, and computer-readable media.

12 Claims, 9 Drawing Sheets

(51) Int. Cl.
     *G06F 16/74*      (2019.01)
     *G06F 3/0482*      (2013.01)
     *G06F 21/60*      (2013.01)

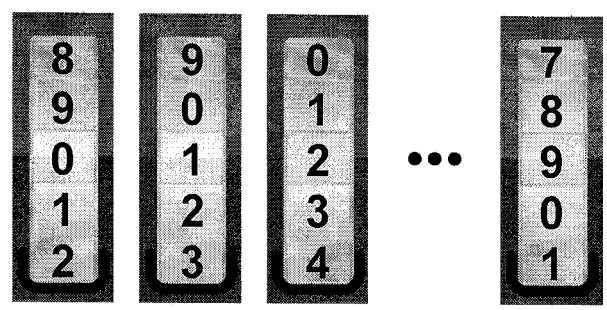
FIGURE 4
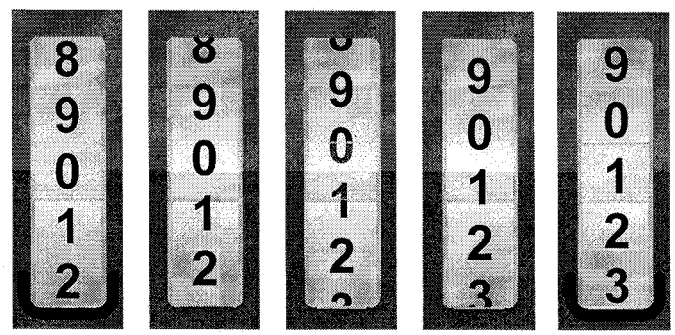
FIGURE 5
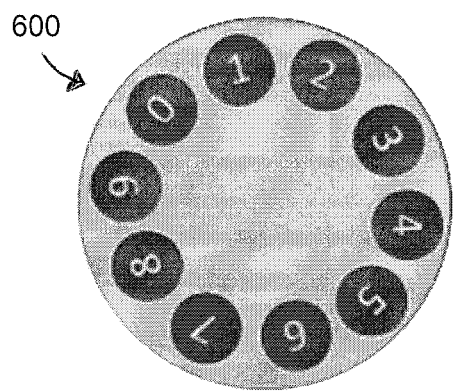 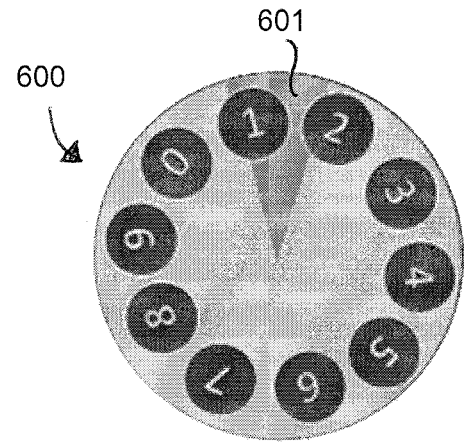
FIGURE 6A                    FIGURE 6B

US 11,113,380 B2

SECURE GRAPHICS

RELATED APPLICATIONS

The present application is a US national phase application of PCT/EP2016/066973 filed on Jul. 15, 2016 and titled Obtaining A User Input, the content being expressly incorporated herein in its entirety.

FIELD OF THE INVENTION

The present invention relates to computer-implemented methods of obtaining a user input. For example, the methods may be used to obtain secure entry of a user PIN input via a user interface on a mobile device.

BACKGROUND OF THE INVENTION

Current mobile devices (e.g. tablets, tablet PCs, phones) are computing platforms with relatively large displays with an overlay touchscreen to obtain user input. Such devices are based on an Operating System (e.g. Android, IOS, Windows 10 Mobile) and a collection of software applications ('Apps') obtained from an App Store. The OS supports various standard user interface widgets for obtaining user inputs, such as pull down menus with sub menus, buttons (e.g. radio buttons, check boxes, cycle buttons), list boxes, spinners, drop down lists, scrollbars, text boxes, virtual keyboards, and post WIMP elements. These user interface widgets are implemented using a Graphics Processing Unit (GPU) which operates independently from the main Central Processing Unit (CPU). The GPU implements 2D computer graphics processing (e.g. alpha compositing) and 3D Computer graphics. The details of the GPU capabilities are generally accessed via a graphics library (e.g. X11, OpenGL, Metal iOS). Mobile devices often use different interaction techniques than personal computers and laptops. Such user interactions are so familiar to end users that they increasingly are adopted in web content (or web applications).

Web browsers now widely support HTML5; the fifth major version of the markup language standard. An important new feature of this standard is the HTML5 video element which replaces a proprietary browser plug in or a browser extension to display video content via a web page. HTML5 further supports an increased range of JavaScript API's such as Encrypted Media Extensions (EME) which provides a communication channel between web browsers and Digital Rights Management (DRM) agent software, thereby enabling the rendering of protected video content. The HTML5 video element has attributes that are exposed in the Document Object Model (DOM) so they can be accessed and manipulated by JavaScript code contained in the web content. The EME in an HTML5 browser implements the ISO Common Encryption Stream Format that is based on the MPEG4 (ISO 14496) part 12 specification, commonly called the ISO base media file format. The content is encrypted using AES-128 in CTR (Counter) mode (which converts a block cipher into a stream cipher). The MPEG DASH interoperability forum promotes MPEG DASH interoperability guidelines with recommendations regarding the specification usage. Chapter 7 of version 3.1 of the DASH-IF InterOperability Points (IOP) describes and clarifies the use of a reduced set of encryption parameters and metadata to support video on demand and live content with key rotation (periodically changing encryption keys) for Over-The-Top (OTT) video content.

PCT/EP2015/069294 describes the use of a secure video playback module to display a randomised numeric keyboard layout to collect a user PIN without revealing the PIN to a monitoring application on the same computing platform observing all user inputs. This technique leverages the secure video path technology supported in the secure video playback module which prevents other applications from accessing the video display memory. PCT/EP2015/069294 also describes a number of ways in which this technology can be used for a range of online and offline applications including a technique to generate protected video content in the encrypted domain.

Existing keyboard/keypad layout randomisation techniques are known from US 2012/0132705, US 2011/0006996, JP 2000-276628, US 2014/0351739 and US 2006/0224523, for example. In combination with the secure video playback technology described in PCT/EP2015/069294, this makes it very hard for an attacker to correlate user inputs to a PIN value.

The present invention seeks to provide alternative computer-implemented methods of obtaining a user input (e.g. a PIN) which provide various advantages over those of the prior art.

SUMMARY OF THE INVENTION

Some software applications operate in an execution environment with limited access to a user graphics API. As an example, an HTML5 web application needs to implement a user interface by manipulations of the DOM in combination with appropriate Cascading Style Sheets (CSS) formatting. This may complicate or limit the implementation of user interaction modes.

Existing keyboard/keypad layout randomisation techniques only provide limited randomisation of the user inputs, especially when users are accustomed to a specific PIN entry method. This makes it easier for an attacker with access to the user inputs to correlate the inputs to a specific PIN.

The present invention contemplates a user interface implemented using video content and associated playback controls. A user interface aims to obtain a user input and then implement a response related to that input. The invention uses video playback controls to implement a wide range of user interface elements/widgets.

The user interface may be encoded in compressed video content and a client application activates the appropriate animation by starting playback at an animation start time offset in the video and by ending (pause) the animation playback at an end time offset. The content can be pre-generated and stored locally or at a server. Alternatively, the content can be (partially) generated in compressed video format in real time. The video content generation makes use of knowledge of the intended user interaction using pre-compiled content fragments (e.g. I-frames). This video content encoding can also be implemented in the client application. In order to protect the content from being accessed by attackers, the content is advantageously (partially) encrypted. More specifically, the pre-generated content fragments are encrypted, and motion compensated frames (e.g. B-frames and/or P-frames) are allowed as clear text (as this does not reveal the video contents). This enables implementation of alternative user interfaces for PIN entry (rotating number wheels, rotating number dials, and moving numbers) that enable a greater degree of randomness in user inputs. It should be noted that the general principle allows a very broad range of user interactions to be implemented as encoded video. It uses knowledge of the user interaction to substantially improve the encoding efficiency.

According to a first aspect of the present invention, there is provided a computer-implemented method of obtaining a user input. The method comprises: (a) providing access to video content, the video content representing a user interface including a plurality of elements for selection by a user; (b) playing a first portion of the video content to the user; (c) detecting a first user interaction occurring in response to the played first portion of the video content; and (d) determining a first element selected by the user based on one or more properties of the detected first user interaction.

According to a first aspect of the present invention, there is provided a computer-implemented method of obtaining a user input. The method comprises: (a) providing access to one or more frames of pre-generated video content encoded in compressed video format; (b) displaying to a user initial video content encoded in compressed video format, the initial video content being based on one or more frames of the pre-generated video content, and the initial video content representing a plurality of graphical elements for selection by a user; (c) detecting a first user interaction occurring in response to the displayed initial video content; (d) determining a first graphical element selected by the user based on one or more properties of the detected first user interaction; (e) in response to the first user interaction, generating new video content encoded in compressed video format based on one or more frames of the pre-generated video content and the one or more properties of the first user interaction; and (f) displaying the new video content to the user.

According to further aspects of the present invention, there is provided an apparatus arranged to carry out a method according to the first or second aspects, a computer program which, when executed by one or more processors, causes the one or more processors to carry out a method according to the first or second aspects, and a computer-readable medium storing such a computer program.

Other preferred features of the present invention are set out in the appended claims.

BRIEF DESCRIPTION OF THE DRAWINGS

Embodiments of the present invention will now be described by way of example with reference to the accompanying drawings in which:

FIG. 4 schematically illustrates stable number wheel positions for numbers on the number wheel;

FIG. 5 schematically illustrates intermediate number wheel positions between two stable number wheel positions;

FIG. 6 schematically illustrates alternative number wheels 600 for obtaining a user input FIG. 7 schematically illustrates a GUI 700 including four number wheels for obtaining a user input;

DETAILED DESCRIPTION OF A PREFERRED EMBODIMENT

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
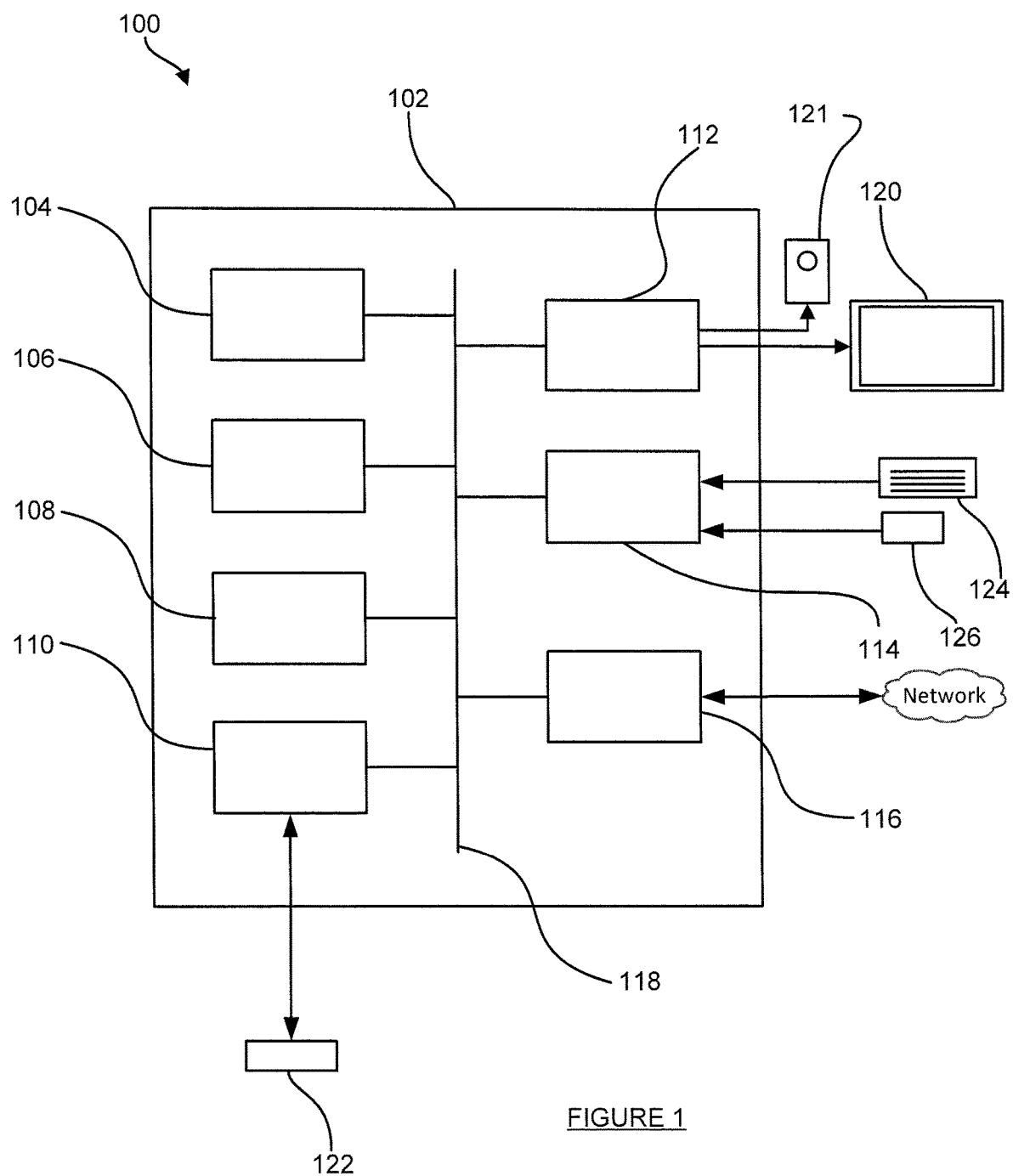
FIG. 1 schematically illustrates an example of a computer system 100 which may be used in embodiments of the present invention.

FIG. 1 schematically illustrates an example of a computer system 100 for obtaining a user input. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc.

The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touchscreen/touchpad, a microphone, and/or a camera). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112. Where a touchscreen is used, it will be appreciated that the touchscreen performs both user input and output functions, so will be coupled to both the user input and output interfaces 112 and 114. In such cases, the touchscreen may replace or supplement one or more of the monitor 120, the keyboard 124 and the mouse 126.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a mobile telephone; a tablet; a tablet PC, a laptop; a television set; a set top box; a games console; other mobile devices or consumer electronics devices; etc. In particular, the computer system 100 could be any computer system for receiving a user input. In a preferred implementation, the computer system 100 is a mobile computing device, such as a tablet or mobile telephone, including a touchscreen.

2—Using Stored Video Content

Figure 2:
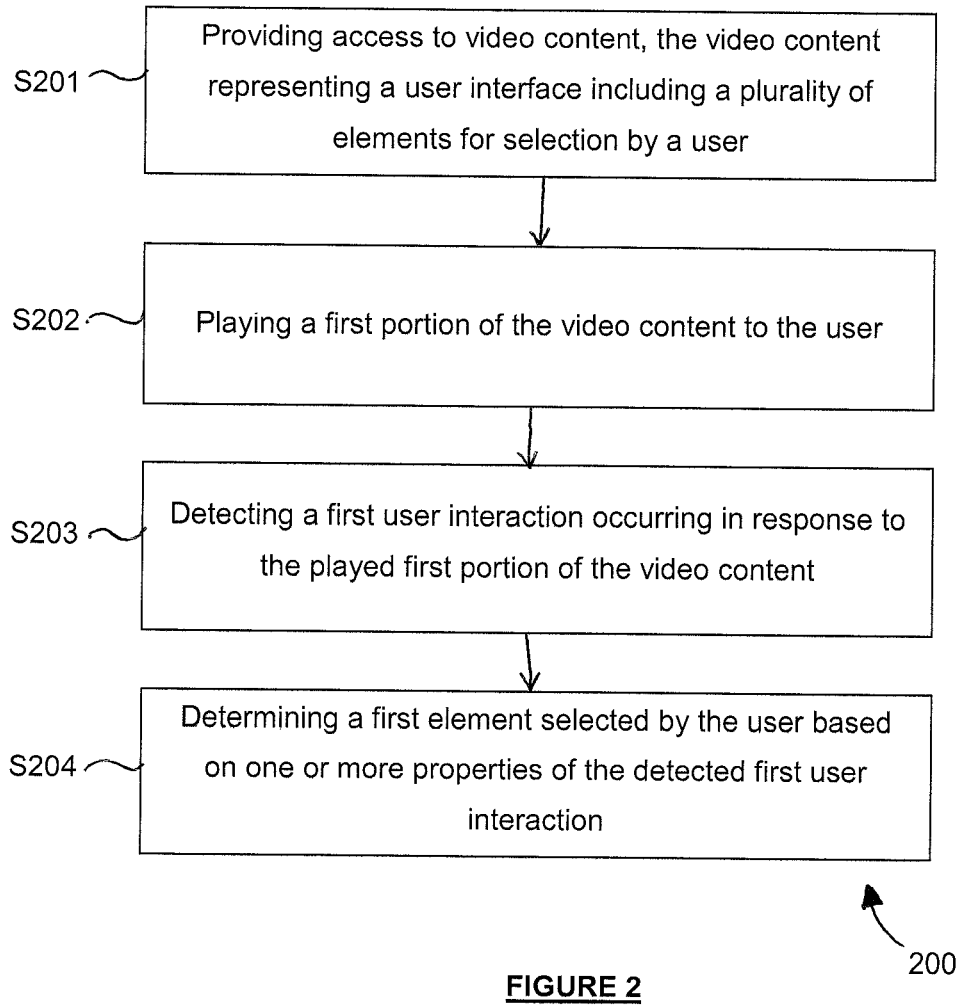
FIG. 2 schematically illustrates a computer-implemented method 200 of obtaining a user input according to the first aspect of the present invention.

As shown in FIG. 2, there is provided a computer-implemented method 200 of obtaining a user input. The method 200 comprises, at step S201, providing access to video content, where the video content represents a user interface including a plurality of elements for selection by a user. At step S202, the method 200 further comprises playing a first portion of the video content to the user. At step S203, the method 200 further comprises detecting a first user interaction occurring in response to the played first portion of the video content. At step S204, the method 200 further comprises determining a first element selected by the user based on one or more properties of the detected first user interaction.

Thus, the method 200 is an implementation of a User Interface encoded in digital video format, and video playback is controlled by user interactions. The video content may include graphical content and/or audio content. In one example, the video content may be encoded in compressed video format to reduce the required bandwidth. The method 200 enables a user to provide a user input by means of a user interaction made in response to played video content. The first portion of the video content played to the user in step S201 comprises one or more of the plurality of elements for selection by the user. When an application running the method 200 receives a user input associated with a user interaction, it may start playback of the video content at a start time offset up to a specific end time offset where the playback is paused. In particular, there is provided a function to control the 'current video frame' (e.g. in the form of setting a video time offset), a function to control playback (forward, backwards, playback rate), and a means to 'pause' playback which is useful to render static graphical user interface elements. Thus, the method 200 may, for example, use 'play', 'pause' and 'skip' to control the video rendering in response to an end user action.

The plurality of elements of the user interface may include graphical elements such as characters, numbers, letters, symbols, punctuation marks, signs, menu items (e.g. pull down menus, sub menus), buttons (e.g. radio buttons, check boxes, cycle buttons), list box items, spinner options, drop down list items, scrollbar items, text box items, virtual keyboard keys, computer game graphics, and/or other graphics. Alternatively/additionally, the plurality of elements of the user interface may include audio elements such as a voice listing numbers/letters/words/etc. for selection by a user.

The method steps of the method 200 may be performed by a computer system such as the computer system 100. For example, the method steps may be stored as program code in a software application in the memory 106 of FIG. 1, executable via the processor 108. Furthermore, during execution of the software application, the video content may be played to the user via the monitor 120 and/or the speakers 121, the first user interaction may be detected by means of the user input interface 114 (which is coupled to one or more user input devices 124, 126, etc.), and the determining step may be carried out by the processor 108. The method 200 may be at least partially implemented at a server, in which case the video streamed to the user from the server depends on the user interaction properties that are sent to the server by a related software application on the client device.

In the method of FIG. 2, the digital video content is entirely pre-generated (e.g. by a server). Such pre-generated video content may be stored locally on the user device (e.g. in the memory 106 of the computer 102 shown in FIG. 1). Alternatively/additionally, the pre-generated video content may be stored on an external device (e.g. device 122) and/or on a server accessible via a network or the internet (both accessible via the network interface 116). The video content may be a single video file, or may be made up of a plurality of video files that playback may switch between seamlessly.

The video content comprises a plurality of video frames. The video content may be playable in a loop. Alternatively, the loop can be implemented by changing the current video frame at the end of the loop to the initial frame of the loop. In this case, the control API should support changing the current (or next frame) and monitoring the current frame value (alternatively a real time clock value could be used as each frame has a fixed 'display time' as determined by the frame display rate).

The steps S202, S203 and S204 of the method 200 may be performed repeatedly as part of a looping construct if multiple user inputs are required. In this case, the portion of the video content played to a user in the step S202 may not be the same every time. For example, a first portion may be played initially, and a second portion may be played in a subsequent loop. Similarly, the user interactions and elements selected by the user may change from loop to loop.

The first portion of the video content may comprise a single frame of the video content, or may comprise a plurality of frames of the video content. When the first portion comprises a plurality of frames, the first portion may consist of a block of video frames that are adjacent to one another in time. For some user interfaces (e.g. the computer menu example described below) the first portion of the video content may always start at a particular location within the video content (e.g. the first frame, or another pre-determined starting frame). Alternatively, from instantiation to instantiation of the user interface, the first portion of the video content may start at a variable location within the video content (e.g. this may be desirable in the number wheel examples described below). In the context of a user interface, there may be a preference for deterministic behaviour. Thus, the starting frame of the first portion of the video content may be varied deterministically for some user interfaces. Alternatively, the starting frame may be varied randomly for other user interfaces; in other words, a starting frame of the first portion of the video content may be randomly selected each time the method 200 is used. Randomness may be beneficial in order to make it hard for an observer to correlate a user interaction with a graphical element selected by the user (e.g. in the PIN entry examples described below). One key benefit of randomness is the diversity that can be achieved in preparing the video content file in the first place. The same content may be included in two different video content files, but with the content in a different order. Thus, if an attacker is able to determine a time offset in the video content of a user interaction, they will not necessarily be able to relate this to the first element selected by the user unless they additionally have access to the video content file itself, as they will not know which of the two video content files is being used. In other words, the two files may have different mappings between the time offset and the selected element. Clearly more than two such video content files could be created to provide further diversity.

As mentioned above, the video content may be encoded in compressed video format. In the field of video compression, a video frame may be compressed using different algorithms, called picture types or frame types. The three major frame types used in video algorithms are I, P and B. An I-frame (or Intra-coded frame) is effectively a fully specified picture, like a conventional static image file. Since I-frames hold all the image information themselves, they are the least compressible, but have the advantage that they may be decompressed without reference to other video frames. In contrast, P-frames and B-frames are both types of motion-compensated frames. A P-frame (or Predicted frame) holds only the changes in the image from the previous frame. For example, in a scene where a ball moves across a stationary background, only the ball's movement needs to be encoded. The encoder does not need to store the unchanging background pixels in the P-frame, thus a higher data compression rate is achieved as compared to an I-frames. A B-frame (Bi-predictive frame) achieves the highest data compression rate by using differences between the current frame and both the preceding and following frames to specify its content.

Regardless of whether or not the video content is encoded in compressed video format, the video content may be at least partially encrypted. For example, the I-frames may be encrypted. At least some of the other frames may also be encrypted.

The user interaction is made in response to the played first portion of the video content. In the method of FIG. 2, the obtained user input is the first element selected by the user. In one example, the first element may be a graphical element in the form of a character forming at least a part of a passcode (such as a PIN). In another example, the first element may be a graphical element in the form of a menu item. Types of user interaction envisaged as examples of the first user interaction include user interactions with a touchscreen, keyboard, mouse, microphone, camera, proximity sensor, motion sensor, chemical sensor, or any other sensor for sensing a user interaction. Specific user interactions may include a swipe detected on a touchscreen, a press detected on a touchscreen, a press of a physical button or key (e.g. a keyboard key or other key/button), a mouse click, a mouse movement, a user gesture detected using a camera, and/or a user audio input detected using a microphone. Of course, any other user interaction is envisaged that enables a user to select a particular element from the plurality of elements represented by the played video content. The step S203 of detecting the first user interaction may comprise detecting the one or more properties (i.e. characteristics) of the first user interaction. The method 200 may further comprise storing the one or more properties of the first user interaction.

Audio Element Example

In one example, the plurality of elements for selection by a user may include one or more audio elements. For example, the video content may include audio comprising a voice listing numbers for selection by visually impaired users. Each listed number may be considered to be an audio element for selection by a user. The user may select a particular audio element (i.e. spoken number) by providing a user interaction when the particular audio element is played to the user. For example, the user may click on a mouse or press a keyboard key (e.g. space bar) when they hear the number "6" being listed, so as to select audio element "6". Thus, the time of the first user interaction relative to the played video content is key in determining the first element selected by the user in this audio example.

It will be understood that audio elements other than numbers may be used. For example, the method 200 may be used to provide a video implementation of an audio user interface which asks a user to select an option from listed audio options (e.g. "To play video file A, press any key now", "To delete video file A, press any key now", "To forward to the next video file, press any key now").

It will also be understood that the audio elements example could be used to select a particular audio element in conjunction with properties other than the timing of the first user interaction. For example, a particular keyboard key could be pressed to select a given audio element (e.g. "To play video file A, press 1", "To delete video file A, press 2", "To forward to the next video file, press 3").

Graphical Element Examples

In one example, the method 200 comprises, at step S201, providing access to video content, where the video content represents a user interface including a plurality of graphical elements for selection by a user. At step S202, the method 200 further comprises playing/displaying a first portion of the video content to the user, where the first portion comprises one or more frames of the video content. At step S203, the method 200 further comprises detecting a first user interaction occurring in response to the played/displayed first portion of the video content. At step S204, the method 200 further comprises determining a first graphical element selected by the user based on one or more properties of the detected first user interaction.

In this example, the video content represents both an initial GUI display and the results of allowed (i.e. supported) user interactions with that GUI display. In other words, the video content represents the various renderings of graphical elements of a GUI both before and after a user interaction.

Where the elements are graphical elements, the terminology of 'playing' the video content may be considered to be equivalent to 'displaying' the video content. Audio may or may not be included as part of the video content.

Below we describe a number of examples in which the plurality of elements for selection by a user include a plurality of graphical elements. It will be understood that these graphical examples could be combined with the use of audio elements as discussed above.

Computer Menu Example

Figure 21:
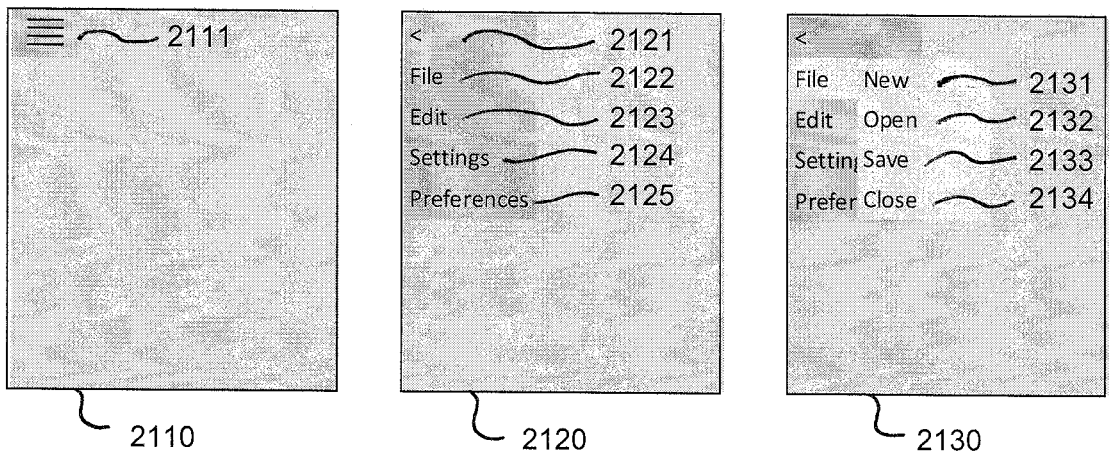
FIG. 21 schematically illustrates a user interface comprising a plurality of menu items for selection by a user.

A particular example of the method 200 is now described in which the video content represents a user interface comprising a computer menu having a plurality of menu items for selection by a user, as illustrated schematically in FIG. 21. The video content represents an initial user interface, as well as the user interface outcomes of all supported user interactions with the computer menu. The user interface is implemented as part of a software application.

At step S201 of the method, access is provided to the menu video content. At step S202, a first portion of the video content is displayed to the user. The first portion comprises the first frame 2110 shown in FIG. 21 which includes a menu icon 2111 in the top left corner. Apart from the menu icon 2111, FIG. 21 shows that the remainder of the first frame 2110 is blank. However, in practice, it will be understood that other information relating to the software application could be depicted in this blank space. In response to the displayed first frame 2110, a user would be expected to click/press on the menu icon 2100. At step S203, this click/press is detected as a first user interaction. At step S204, the method 200 further comprises determining a first graphical element selected by the user based on one or more properties of the detected first user interaction. In this menu example, the first portion of the video content only includes a single graphical element in the form of the menu icon 2111. Thus, in this case, the first graphical element selected by the user is the menu icon 2111. Only one property of the first user interaction is required to determine that the menu icon 2111 has been selected by a user, namely the location of the first user interaction relative to the displayed video content.

The method 200 may further comprise, in response to the first user interaction, playing/displaying a second portion of the video content to the user, the second portion of the video content being selected based on the one or more properties of the first user interaction. The second portion of the video content may comprise one or more frames of the video content. In this menu example, the second portion of the video content represents a drop down main menu including a number of graphical elements for selection by a user. For example, the second portion may comprise the second frame 2120 shown in FIG. 21. The second frame 2120 includes five graphical elements for selection by the user, namely a 'back' menu item 2121, a 'File' menu item 2122, an 'Edit' menu item 2123, a 'Settings' menu item 2124, and a 'Preferences' menu item 2125.

The method 200 may further comprise detecting a second user interaction occurring in response to the displayed second portion of the video content, and determining a second graphical element selected by the user based on one or more properties of the detected second user interaction. In this menu example, a user would be expected to click/press on one of the menu items 2121-5 in response to the displayed second frame 2120. This click/press is the second user interaction. Again, only one property of the second user interaction is required to determine which of the menu items 2121-5 has been selected by a user, namely the location of the second user interaction relative to the displayed video content.

The method 200 may further comprise, in response to the second user interaction, displaying a third portion of the video content to the user, the third portion of the video content comprising one or more frames of the video content, and the third portion of the video content being selected based on the one or more properties of the second user interaction. In this menu example, if the 'back' menu item 2121 was the second graphical element selected by the user, then the third portion of the video content may be the same as the first portion of the video content which represents the original menu icon 2111. Alternatively, if any of the other menu items 2122-5 was the second graphical element selected by the user, then the third portion of the video content may represent a sub menu including a number of graphical elements for selection by a user. Thus, the video content includes For example, if the 'File' menu item 2122 was the second graphical element selected by the user, the third portion may comprise the third frame 2130 shown in FIG. 21. The third frame 2130 includes four further graphical elements for selection by the user, namely a 'New' menu item 2131, an 'Open' menu item 2132, a 'Save' menu item 2133, and a 'Close' menu item 2134.

The method 200 may further comprise detecting a third user interaction occurring in response to the displayed third portion of the video content, and determining a third graphical element selected by the user based on one or more properties of the detected third user interaction. In this menu example, a user would be expected to click/press on one of the menu items 2131-4 or to click/press elsewhere on the display to go back. This click/press is the third user interaction. Again, only one property of the third user interaction is required to determine which of the menu items has been selected by a user, namely the location of the third user interaction relative to the displayed video content.

Expressed differently, the computer-implemented method 200 of obtaining a user input may alternatively be considered as comprising: (a) providing access to video content, where the video content represents a user interface including a plurality of elements for selection by a user, (b) performing the following steps: firstly playing a portion of the video content to the user; secondly detecting a first user interaction occurring in response to the played portion of the video content, and thirdly determining an element selected by the user based on one or more properties of the detected user interaction; and (c) optionally repeating the steps performed in (b) one or more times so as to determine one or more further elements selected by the user. During step (c), the portion of the video content played to the user may be based on the previously detected user interaction and/or the previously played portion of the video content and/or the previously selected element. Thus, the method 200 enables a user to perform any number of user interactions to select a sequence of elements from the plurality of elements.

Thus, the detected user interactions enable the user to control the software application by means of the user interface. In particular, the detected user interactions cause different portions (frames) of the video content to be displayed to the user. Thus, the video content represents the results/outcome of all supported user interactions with the user interface computer menu. Clicking/pressing on the menu items enables a user to control the software application. This is implemented by means of skipping backwards and forwards in the video to display the appropriate frame of video content to the user depending on the detected user interaction. In other words, the set of menu and submenu displays is captured in the video content. The software application implementing the menu system sends the video content to a video playback module and uses its playback control interface to play the relevant portion (frame) of the video content, thus enabling the user to navigate the menu system of the application. A similar methodology 200 may be used to enable a user to control a computer game software application. In particular, video content may represent the results/outcome of all possible user interactions with the computer game, and then it is possible to skip backwards and forwards in the video to display the appropriate portions of video content to the user depending on the detected user interactions.

In this computer menu example, each of the portions of video content displayed to the user comprises a single frame of video content. However, it will be understood that multiple frames could be used for each portion of the video content to provide dynamically varying (e.g. flashing) graphical elements. Also, in this computer menu example, the graphical elements selected by the user are used to control operation of the software application. It will be understood that the menu shown in FIG. 21 is exemplary, and other menus or other user interface widgets (e.g. drop down lists, virtual keyboards, spinners) could also be used to control operation of a software application, all of which could be implemented by means of video as per the method 200.

Number Wheel Example

Figure 3A:
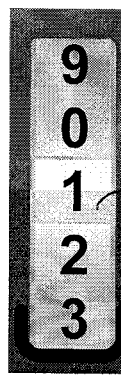
FIG. 3 schematically illustrates number wheels 300 for obtaining a user input.

Other embodiments are now described in which the video content represents rotation of a wheel of graphical elements including the plurality of graphical elements. An exemplary wheel of graphical elements 300 is shown in FIG. 3A. The plurality of graphical elements in this example are the integer numbers 0, 1, 2, . . . , 9 such that the wheel is a number wheel 300 in this case. However, it will be appreciated that other graphical elements (e.g. letters, words, symbols, punctuation marks, signs, characters, and/or other graphics) could also be used depending on the intended application.

The number wheel 300 is similar to that used as part of a standard combination lock or slot machine. A centre highlight bar 301 indicates the selected number (the selected number shown in FIG. 3A is '1'). It will be appreciated that the highlight bar 301 need not be in the centre of the visible wheel 300 (e.g. it could be at the top or bottom or elsewhere on the wheel if desired). In addition, it will be appreciated that the highlight bar 301 could have a configuration other than that of a "bar" (e.g., a highlight circle could be used). The highlight bar 300 is merely an area/region/shape which indicates the number that is currently selected on the number wheel 300.

Figure 3B:
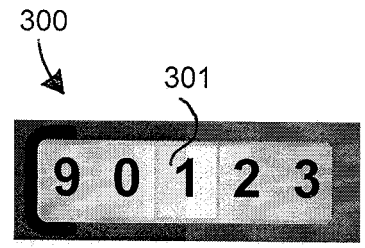

The video content represents at least one full rotation of the number wheel 300, such that each number is available for selection by a user at at least one point within the video content. The video content may be played in a loop to depict multiple rotations of the wheel. The axis of rotation of the number wheel is parallel to or lies within the display screen. In FIG. 3A, the axis of rotation is horizontal such that the number wheel 300 is vertically oriented and rotates vertically (i.e. rotates within a vertical plane). As shown in FIG. 3B, the number wheel also may have a vertical axis of rotation such that the number wheel is horizontally oriented and rotates horizontally. It will be understood that any direction between these two directions (i.e. a diagonal orientation) is also possible.

The number wheel positions for the various selected numbers 0, 1, 2, . . . , 9 are shown in FIG. 4. FIG. 4 shows only the 'stable' number positions. The video content also represents the animation of the numbers gradually moving between adjacent number positions. A few images of the sequence to animate the change from number position '0' to number position '1' is shown in FIG. 5 (from left to right). In FIG. 5, the front of the number wheel can be seen to rotate upwards to move from number position '0' to number position '1'.

Two potential variants are envisaged for the number wheel example: a first variant where the number wheel 300 is initially rotating and may be stopped at a particular selected number by a user interaction; and a second variant where the number wheel 300 is initially stationary and may be rotated to a particular selected number by a user interaction. These variants will be described in turn below. As before, it will be understood that the graphical elements being numbers in these variants is purely exemplary.

Number Wheel Example: Initially Rotating Variant

In the first variant, the first portion of the video content (i.e. the portion that is initially displayed to the user in step S202) includes a plurality of frames of the video content. In other words, the first portion of the video content provides a dynamic initial display in which video is played to the user. Thus, the first portion of the video content may comprise the entire video content played in a loop/cycle. The first portion of the video content depicts movement of at least some of the plurality of graphical elements. In the number wheel example, the first portion of the video content depicts the number wheel 300 rotating/spinning through at least a partial rotation of the number wheel.

In response to the displayed first portion of the video content, a user interaction occurs in step S203. The user interaction may be at a particular time when an intended number is shown in the highlight bar 301. There may be a dedicated button displayed as part of the first portion of the video content, and the user may press/click this button when the intended number is shown in the highlight bar 301. Alternatively, the user interaction may be a screen press or click on the number wheel 300 itself. In one example, only the timing of the press on number wheel 300 is important (i.e. the user may press anywhere on the number wheel 300 when the intended number is shown in the highlight bar 301). In another example, the timing and location of the press on the number wheel 300 are both important (i.e. the user may press at a location on the number wheel 300 that is showing the intended number at the time of the press). Other user interactions may be envisaged to select an intended number.

Step S203 includes detecting the first user interaction. This step S203 may comprise detecting the one or more properties of the first user interaction. As described above, a key property of the first user interaction is the time of the first user interaction relative to the displayed video content. Thus, step S203 may involve detecting a time of the first user interaction relative to the displayed video content. The location of the user interaction relative to the displayed video content may also be important. Thus the one or more properties referred to in step S204 include the time of the first user interaction relative to the displayed video content and optionally the location of the user interaction relative to the displayed video content.

In response to the first user interaction, the method 200 may comprise pausing display of the first portion of the video content. This provides visual feedback to the user to enable them to see what number has been selected by means of the first user interaction. In this case, the first user interaction stops the number wheel 300 rotating. For example, there may be a 'stop' button displayed as part of the first portion of the video content, and the user may press/click this button to stop rotation of the number wheel 300. Other user interactions to stop rotation of the number wheel 300 may be envisaged (e.g. pressing on the number wheel 300 itself as described above).

In an advantageous example, the number wheel 300 continues to rotate until stopped at a particular orientation by the first user interaction. In this case, if the number wheel 300 stops at an orientation that has not reached the intended number (e.g. the intended number is not yet shown in the highlight bar 301), a further user interaction may be used to re-start the rotation of the number wheel 300, and then another user interaction may be used to re-stop the number wheel 300 at the intended number. The final user interaction which causes the number wheel 300 to stop at the intended number may be considered as the first user interaction of step S203 in this case.

In step S204, a first number selected by the user is determined based on one or more properties of the detected first user interaction. The first number selected by the user is the "intended number" referred to above as being the one selected by the user. The one or more properties of the first user interaction may be uniquely associated with the first number to enable determination of the first number. In other words, the one or more properties of the first user interaction may be mapped to a particular number. As discussed above, it may be only the time of the first user interaction relative to the displayed video content which maps to the first number (e.g. in the 'stop' button example above). Alternatively, the time and location of the first user interaction relative to the displayed video content may together be mapped to a particular number (e.g. in the example above of pressing on the intended number on the number wheel 300, regardless of whether or not the intended number is in the highlight bar at that time). The software application comprising the method 200 is arranged to access the relevant mappings (e.g. the mappings may be stored locally or may be accessible via a server). The mappings themselves implicitly depend on a knowledge of the first portion of the video content.

Figure 7:
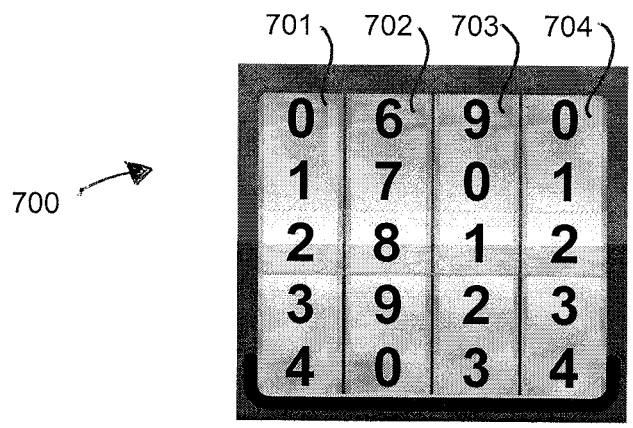

Once the first number has been selected, the plurality of numbers shown on the number wheel may be blanked out or otherwise obscured to prevent 'shoulder surfing. This may be implemented by skipping playback of the video content to a location in the video content where the number wheel is depicted with blanked out numbers. As example of number blanking is shown in FIG. 7 for wheel 703 of number wheel 700. Thus, in this embodiment, the method may further comprise, in response to the first user interaction, displaying a second portion of the video content to the user, the second portion of the video content comprising one or more frames of the video content. In this case, the second portion of the video content is a frame representing the number wheel 300 with all of the numbers blanked out.

It will be understood that a user may select further numbers in turn by means of the same number wheel if desired. For example, a 'next' button could be pressed to indicate that the first number has been selected successfully and it is desired to select a subsequent number. Similarly, an 'end' button could be pressed to indicate that all necessary numbers have been selected. Thus, a single wheel of graphical elements may be used to input a multi-element password, passcode or PIN.

Number Wheel Example: Initially Stationary Variant

In this second variant, the first portion of the video content initially displayed to the user in step S202 need not include a plurality of frames of the video content. Instead, the first portion of the video content includes one or more frames of the video content in which the plurality of graphical elements are depicted in a stationary configuration. For example, the first portion of the video content may consist of a single frame of the video content such that displaying the first portion comprises statically displaying the single frame (i.e. displaying the single frame in pause mode). In the number wheel example, the first portion of the video content depicts the number wheel 300 stationary in a particular orientation.

In response to the displayed first portion of the video content, a first user interaction occurs in step S203. The first user interaction in this second variant is an interaction which causes the number wheel 300 to rotate from its initial stationary orientation to a final orientation in which the intended number is shown in the highlight bar 301. In a preferred embodiment, the first user interaction comprises a swipe up/down over the number wheel 300 which causes the wheel 300 to rotate to the intended number in the direction of the swiping motion. Multiple small swipes may be used in place of a single larger swipe. Other user interactions for rotating the number wheel 300 are envisaged, such as a tap up/down, a physical up/down button, a gesture recorded by the camera, a voice command, and/or a mouse scroll/drag. A 'done' button (or similar) may be provided for a user to press once the intended number is shown in the highlight bar 301.

Step S203 includes detecting the first user interaction. Step S203 may include detecting one or more properties of the first user interaction. One such property may be a direction of the user interaction (e.g. a swipe direction) relative to the number wheel orientation. For example, detection of whether a swipe is up/down relative to the vertically oriented number wheel 300 shown in FIG. 3A, or detection of whether a swipe is left/right relative to the horizontally oriented number wheel 300 shown in FIG. 3B. In one embodiment, the number wheel 300 may only rotate in one direction, so a swipe in the wrong direction may not cause the number wheel 300 to rotate at all. Other properties of the user interaction which may be detected include a length (in time, and/or in physical distance) of the user interaction and/or a speed of the user interaction. In one embodiment, swiping over the number wheel causes the number wheel to rotate to the next number in the direction of the swiping motion regardless of the length/speed of the swipe. Thus, different algorithms for converting from a detected user interaction to a movement of the number wheel 300 may clearly be envisaged using various different properties of the user interaction. Exemplary properties of the first user interaction which may be detected are a movement direction of the user interaction relative to the displayed video content (e.g. a swipe direction relative to the number wheel orientation), a movement speed of the user interaction (e.g. speed of swipe), a length in time of the user interaction (e.g. length of swipe in time), a physical length (i.e. distance) of the user interaction relative to the displayed video content (e.g., length of swipe in distance), a time of the user interaction relative to the displayed video content (e.g. the time of the video content at which the video was initially paused with the number wheel 300 stationary), and a location of the user interaction relative to the displayed video content (e.g. in the vicinity of the displayed number wheel, or not). Another property of the first user interaction is an identity of a sensor or input device used to detect the user interaction. Another property of the first user interaction which may be detected is the location of the user interaction on a keyboard (i.e. the location of the user interaction determines which keyboard key has been pressed). Another property of the first user interaction which may be detected is a sound or word associated with the user interaction (e.g. for a voice command). In one example, an eye tracking device combined with voice commands may be used to select a graphical element.

In response to the first user interaction, the method 200 may further comprise playing/displaying a second portion of the video content to the user. The second portion of the video content may comprise a plurality of frames of the video content. The second portion of the video content is selected based on the one or more properties of the first user interaction. In other words, the displayed second portion of the video content is determined by the user interaction: a different user interaction might lead to a different second portion. In the number wheel example, the second portion of the video content shows the number wheel 300 rotating from its initial stationary orientation to a final orientation in which the intended number is shown in the highlight bar 301. Thus, the first user interaction effectively controls playback of the video content.

As for the first variant, a first graphical element selected by the user is determined in step S204 based on the one or more properties of the first user interaction. In order to determine the first number from the properties of the first user interaction, knowledge of the first portion of video content (that was initially displayed to the user) is required. For example, a given user interaction (e.g. a given swipe) might cause the number wheel to rotate by 3 numbers upwards. Thus, it is necessary to have knowledge of both the number wheel position in the first portion of the video content, and the properties of the swipe to determine the first user input. Together with knowledge of the first portion of the video content (e.g. a time offset at which the video content is paused to display the first portion), the one or more properties of the first user interaction may be uniquely associated with the first number to enable determination of the first number. Hence, as in the first variant, the mappings from the user interaction properties to the input numbers implicitly depend on a knowledge of the video content.

As for the first variant, it will be understood that a user may select further numbers in turn by means of the same number wheel if desired.

Thus, this variant enables a user to control playback of the video content dependent on their interactions with the displayed content. The video content contains all animations for responding to user interactions. In the number wheel example the video content contains all number positions and the animation of the number wheel rotating to the next position. The response to a user swipe involves starting playback of the video content from the current number position and ending at the next number position as determined by the user swipe. The video play could be forward or backward. Upon reaching the position in the video content corresponding to the next/intended number position, the playback of the video content is paused.

If a video module in a computer 102 only supports rendering in forward mode, then it may only be possible to rotate the number wheel in a forward direction (as mentioned above). Alternatively, the video content may be a single video file comprising first and second parts in sequence, the first part representing rotation of the wheel in a first (forward) direction and the second part representing rotation of the wheel in a second (backward) direction opposite to the first direction. Thus, the video content contains two time positions for a given stationary number wheel position: a first position where forward play of the video from there onwards would rotate the number wheel in one direction from the stationary position, and a second position where forward play of the video from there onwards would rotate the number wheel in the other direction from the stationary position. Displaying the second portion of the video content in response to the user interaction then involves skipping to the appropriate time position in the video content, starting playback (in forward mode), and pausing when the time position for the next/intended number is reached. Thus, the first and second portions of video content need not be adjacent within the video content. As a further alternative, the playback may use two files with a forwards and a backwards rotating wheel, and playback may switch between the two files depending on the user input. In other words, the video content may be made up of first and second video files, the first video file representing rotation of the wheel in a first direction and the second video file representing rotation of the wheel in a second direction opposite to the first direction.

The HTML5 video element has a property 'playbackRate' which allows video to be played at a faster or slower rate, or in reverse for negative values. Thus, the playbackRate may be responsive to the detected swipe speed of the first user interaction.

Alternative Number Wheel Examples

Alternative number wheels 600 are shown in FIGS. 6A and 6B. Either of these wheels 600 may be used in the first variant described above. The wheel 600 shown in FIG. 6A may alternatively be used in the second variant described above. It will be understood that numbers are again being used as specific examples of the plurality of graphical elements which form the user interface, and the use of numbers is not intended to be limiting, either in this section or any other section of the description.

The number wheels 600 look somewhat similar to rotary dials seen on old telephones. Again, the number wheels 600 depict the numbers 0, 1, 2, . . . , 9. However, during rotation of the number wheels 600 all of the numbers are always visible (cf. the number wheels 300 of FIGS. 3A and 3B where only a subset of numbers are ever visible at one time). The axis of rotation of the number wheels 600 is perpendicular to the display screen such that the number wheels 600 rotate in the plane of the display screen. Similar to the number wheels 300 of FIGS. 3A and 3B, the number wheel 600 of FIG. 6A has a highlight area 601 (formed as a sector of the wheel) to indicate a particular selected number. Thus, similar user interactions may be used to select an intended number as described above with reference to the number wheel 300. In contrast, the number wheel 600 of FIG. 6B does not have a highlight bar. Thus, in this case, both the time and location of the first user interaction relative to the displayed video content are required in step S204 in order to determine the first number selected by the user.

Multiple Wheels: Multiple Video Windows

In another variant, multiple rotating number wheels may be used to enter a multi-digit PIN, for example. An exemplary GUI 700 including four number wheels is shown in FIG. 7. The GUI 700 of FIG. 7 comprises four vertically oriented number wheels 701-704 displayed side-by-side such that they all have a common horizontal axis of rotation. In FIG. 7, the GUI shows numbers "2812" assigned to the four number wheels.

A simple implementation of the multiple number wheel GUI 700 uses multiple video windows, each targeted to display a single rotating wheel video as described above. The user interaction process may follow a fixed sequence for activating each number wheel in turn (e.g. from left to right). For example, a first swipe interaction might be associated with the first number wheel 701 regardless of the location of the swipe relative to the displayed number wheels. Alternatively, a user interaction may itself determine which wheel the interaction relates to. For example, a swipe that is located predominantly in a display area associated with a given number wheel, or there might be 'up/down' or 'stop' buttons associated with each respective wheel.

Each wheel may be associated with a respective video content file. Use of separate video content files for each wheel easily enables each wheel to start at a different (random) number. It also enables the use of different rotational speeds for different wheels. In addition, use of multiple video content files enables the use of one or more extra wheels with 'blank' values (to confuse an attacker), if desired. If an attacker has access to the user interaction data, but not to the video content displayed to a user (e.g. this may be achieved using the secure video path playback mode as described in PCT/EP2015/069294), the attacker is not able to determine the user input data as this mode of PIN entry has a very large number of variables that map to a specific PIN input value. This increases the apparent randomness of user interactions when entering a particular PIN, making it far more difficult to correlate user interactions with a particular PIN.

As in the single wheel variants described above, the wheels could be initially rotating (for the user to stop at the appropriate numbers) or initially stationary (for the user to rotate to the appropriate numbers). In the variant where the wheels are initially stationary, the application running the method 200 may use the video content files to generate an introduction sequence which spins the wheels for a certain period of time to a particular starting position (much like a slot machine). After the introduction sequence, the end-user can start with the number entry, as per the method 200 described above.

As in the single number wheel examples, the application sends the encoded video content to a video module for playback. A web application in a browser would implement this using the HTML5 video element and (optionally) the EME. In the example where the wheels are initially stationary, the application configures the playback device to start playback at an initial timestamp associated with a particular wheel position. A user interaction then triggers playback of the video to the next wheel position timestamp. A web application in a browser would implement this using the video control attributes of the HTML5 video element that support actions such as play, pause, start at, and reverse playback.

Multiple Wheels: Single Video Window 1

In some application environments, it may not be feasible to use multiple video windows for animating the PIN entry. In that case, the pre-recorded content needs to capture a far larger number of wheel positions. For four dials of 10 number values, there are $10^4$ different number positions. Each position can go forward to four different positions and backwards to four other positions. So for N wheels each containing M positions, there are $2N \cdot M^N$ transitions for $M^N$ different PIN wheel positions (which may include positions with blank values). This could result in a fairly large content file and a fairly large number of content positions necessary to implement the change of any single wheel position. If reverse playback is not supported, the video file size will increase even further.

For the example in which the wheels are initially stationary, the application is able to determine starting times in the video content file associated with each possible PIN, each with one of four forward and four backwards transitions to a next PIN. Thus, assuming that forward and backward playback are supported, there will be four different starting positions in the video content file initially showing 7777, for example. The first starting position will enable forward playback to 8777 and backward playback to 6777. The second starting position will enable forward playback to 7877 and backward playback to 7677. The third starting position will enable forward playback to 7787 and backward playback to 7767. The fourth starting position will enable forward playback to 7778 and backward playback to 7776. If only forward playback is supported, there will be eight different starting positions in the video content file showing 7777. Blanks and other symbols increase the range of possible "PINs". The multiple starting positions for each PIN can be handled by establishing a function that maps number transitions on wheels to video periods (start time, end time) and the associated playback direction. The encoded video can be relatively compact as there is a large amount of redundancy in the wheel animations which can be efficiently encoded using motion vectors by a video encoder with knowledge of the video animations that need to be encoded.

As already outlined in the single number wheel example, playback control can be implemented locally at the client or remotely at a server after receiving a user input.

Multiple Wheels: Single Video Window 2

In one implementation of multiple wheels in a single video window, the number wheels are rotating constantly and the user can stop/re-start a wheel by a user interaction (mouse click, tap) in relation to that wheel. Properties of the user interaction can be matched to a video time offset and to a particular wheel. When the end user has stopped all wheels at the desired number positions, the application can submit the user interaction properties for further processing. Separate stop/re-start buttons may replace the user interaction within a number wheel screen area.

This input method can be implemented using a video file comprising several video segments. In an initial video segment, all wheels are rotating continuously (through full rotations). In other words, the initial video segment represents rotation of multiple number wheels. To provide the first portion of video content to be played to the user, the software application establishes partial or repeated playback of the initial video segment to show all four wheels rotating. The wheels might rotate in different directions and/or at different speeds, or not.

A first user interaction then selects and stops a first wheel at a particular time when a first number is highlighted on the first wheel, and the application records the time offset within the video content as well as the selected wheel. Thus, as for the general method 200 described above, the properties of the first user interaction occurring in response to the displayed first portion of the video content are detected. In this case, the properties are the location and time of the first user interaction. A location of the first user interaction is associated with the first wheel of the multiple wheels. The detected time and location of the first user interaction are used to determine the first number selected by the user. In other words, the first wheel and the time of the first user interaction are together associated with the first number, and the determined user input is the first number that was highlighted on the first wheel when it was stopped by the user.

Playback may then be continued using another video segment of the video content in which the first wheel is stationary, and the remaining wheels continue to rotate continuously. In this segment of the video content, the first wheel remains stationary at a particular rotational orientation as defined by the rotational orientation of the first wheel in the first portion of the video content at the time of the first user interaction. The second portion of the video content played to the user is taken from this video segment. Thus, in response to the first user interaction, the second portion of the video content is displayed to the user. The second portion comprises a plurality of frames of the video content, and the first wheel is stationary in the second portion of the video content.

In one example, a first video segment comprises the first portion of the video content and a second video segment comprises the second portion of the video content, where the second video segment is selected from multiple second video segments. Each of the second video segments represents rotation of all but one wheel of the multiple wheels with the one wheel being stationary. Thus, in this four wheel example, there are four second video segments, each with a single stationary wheel and three wheels that make a full rotation. The selected second video segment (from the multiple second video segments) to be displayed to the user is the one in which all but the first wheel of the multiple wheels are rotating and in which the first wheel is stationary.

Figure 8:
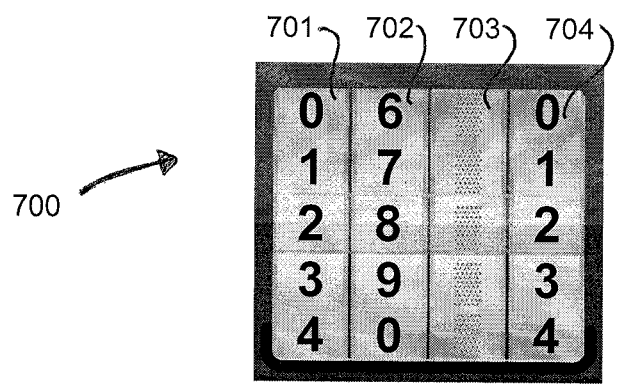
FIG. 8 schematically illustrates the GUI 700 with one of the number wheels showing blanked out numbers.

In order to reduce the number of video segments required, the stationary (first) wheel may be shown with 'blanked' or otherwise obscured numbers in the second content portion of the video content. This also helps to deter 'shoulder surfing'. An example is shown in FIG. 8 where the first wheel is the wheel 703. Thus, it will be understood that the 'first' wheel mentioned above could be any one of the wheels 701-704; the label 'first' is merely used to identify the wheel that the user interacts with first. Similarly for the second through fourth wheels discussed below.

Consider the transition between displaying the first and second portions of the video content to the user. The wheels which continue to rotate between the first and second portions of the video content (i.e. all but the first wheel) should preferably rotate in a continuous manner between the first and second portions of the video content. In other words, there should be no discontinuity in the displayed rotation of these number wheels. Thus, the number wheel positions of each of the non-stopped number wheels should be the same at the end of the first portion of the video content as at the start of the second portion of the video content. The application may stop displaying the first portion at the time of the first user interaction. The application then needs to skip playback to the relevant second video segment for a single stationary wheel and start playing at a time offset within that second video segment that preserves the number position of the rotating wheels between the first and second portions of the video content. In one example, time aligning the number wheel rotation of all video segments (covering a full number wheel rotation) enables the application to use the recorded time offset for calculating a starting time offset in the next video segment. This simplifies playback control.

In the four wheel example described here, the following video segments are required, each with different stopped number wheels:
  1 first video segment with four rotating number wheels;
  4 second video segments, each with 1 stationary (blanked) number wheel and the remaining 3 wheel rotating;
  6 third video segments, each with 2 stationary (blanked) number wheels and the remaining 2 wheels rotating; and
  4 fourth video segments, each with 3 stationary (blanked) number wheels and the remaining 1 wheel rotating.

Thus, the number wheel animation can be implemented using a video file containing 15 video segments. Assuming that it takes 1 second to rotate a number wheel from one number to an adjacent number, the full rotation period is approximately 10 seconds for each video segment. This results in a total video content file duration of 150 seconds. At a 900 Kbit/sec video encoding rate, this amounts to a video file of around 17 Mbyte. Note that 900 Kbit/sec is an exemplary video encoding rate for compressed video content. Depending on resolution, video compression syntax, and video codec, video encoding rates may vary considerably.

After starting playback of a second video segment, the application waits for a second user interaction to stop another number wheel, records the time offset for the second video segment and the selected number wheel, and skips to a relevant third video segment containing one more stationary (blanked) number wheel. Again, this shows that the user interaction is used to determine the particular number wheel and also the number selected for that number wheel. This continues until the last wheel is stopped. This process is set out in further detail below.

In response to the displayed second portion of the video content, the user may make a second user interaction which may be detected by the application. The second user interaction acts to stop a second of the remaining wheels at a chosen second number. As for the first user interaction, the second number selected by the user may be determined based on the displayed video content and one or more properties of the second user interaction. Again, the properties in this example are the time and location of the second user interaction. The location of the second user interaction is associated with the second wheel of the multiple wheels. In response to the second user interaction, a third portion of the video content is displayed to the user. The third portion comprises a plurality of frames of the video content, and the first and second wheels are stationary in the third portion of the video content.

In one example, a third video segment comprises the third portion of the video content, and the third video segment is selected from multiple third video segments. Each of the third video segments represents rotation of all but two wheels of the multiple wheels with the two wheels being stationary. Thus, in this four wheel example, there are six third video segments. The selected third video segment (from the multiple third video segments) to be displayed to the user is the one in which all but the first and second wheels of the multiple wheels are rotating and in which the first and second wheels are stationary.

In response to the displayed third portion of the video content, the user may make a third user interaction which may be detected by the application. The third user interaction acts to stop a third of the remaining wheels at a chosen third number. As for the first and second user interactions, the third number selected by the user may be determined based on the displayed video content and one or more properties of the third user interaction. Again, the properties in this example are the time and location of the third user interaction. The location of the third user interaction is associated with the third wheel of the multiple wheels. In response to the third user interaction, a fourth portion of the video content is displayed to the user. The fourth portion comprises a plurality of frames of the video content, and the first to third wheels are stationary in the fourth portion of the video content.

In one example, a fourth video segment comprises the fourth portion of the video content, and the fourth video segment is selected from multiple fourth video segments. Each of the fourth video segments represents rotation of all but three wheels of the multiple wheels with the three wheels being stationary. Thus, in this four wheel example, there are four fourth video segments. The selected fourth video segment (from the multiple fourth video segments) to be displayed to the user is the one in which all but the first to third wheels of the multiple wheels are rotating and in which the first to third wheels are stationary.

In response to the displayed fourth portion of the video content, the user may make a fourth user interaction which may be detected by the application. The fourth user interaction acts to stop a fourth of the remaining wheels at a chosen fourth number. As for the first to third second user interactions, the fourth number selected by the user may be determined based on the displayed video content and one or more properties of the fourth user interaction. Again, the properties in this example are the time and location of the fourth user interaction. The location of the fourth user interaction is associated with the fourth wheel of the multiple wheels.

This example uses four wheels, so no further portions of video content need be displayed to a user following the fourth user interaction. Nonetheless, it will be understood that further portions may be displayed depending on the number of wheels and the number of user inputs required.

In one example, as in the four wheel example described here, the various video segments are part of a single video file. Alternatively, the video segments may be shared between a number of separate video files.

Once all wheels have been stopped as described above, the application can use the properties (e.g. times and locations) of each of the various user interactions, together with knowledge of the video content, to determine the full PIN that has been input by the user. In other words, knowledge of the video content enables the user interaction properties to be mapped to digits of the input PIN. The starting position of each of the number wheels is easily varied between PIN entry requests. For example, the same video content file may be used for multiple PIN entry requests, but with a different first portion of the video content being played to the user initially. Alternatively, a different video content file may be used for different PIN entry requests, with each video content file having a different mapping between time offsets and numbers (and the associated changes in playback control). Thus, an attacker without knowledge of the video content cannot derive the PIN values from the time offsets (one way of preventing an attacker from gaining knowledge of the video content is to use DRM protection of the video content and to use a secure video path for displaying the video content to the user—see PCT/EP2015/069294). The application may also implement a re-start of a previously stopped number wheel by starting playback of a suitable video segment with one less stationary number wheel.

In this example, the software application uses a single user interaction to find out which wheel was selected and which value is displayed on that wheel. Both parameters determine the next portion of the video content to be displayed in response to the user interaction. Alternatively, a first user interaction could be used to find out which wheel is selected (e.g. a screen press on a particular wheel) such that the first element selected by the user is the first wheel. Then, a second user interaction could be used to select a particular value being displayed on that wheel (e.g. a screen press on a "stop rotation" button) such that the second element selected by the user is a particular character/number on the previously selected wheel. The same approach may be used in a GUI screen with multiple 'widgets', where the application first determines which widget is selected and then determines which response the widget needs to perform. As mentioned above, this could be in response to a single user interaction or to a sequence of user interactions. A single user interaction thus can trigger a sequence of processing steps.

PIN Entry Variants

Figure 17:
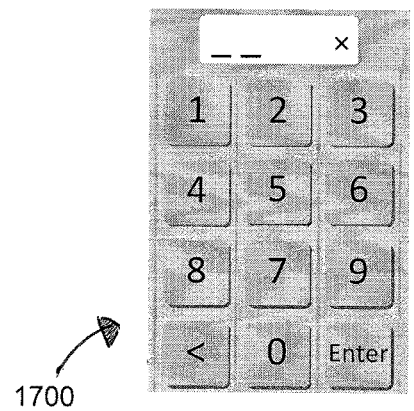
FIG. 17 schematically illustrates a fixed keypad 1700 to enter a PIN code.

In some applications it is desirable that the user input is processed locally in the end-user device (e.g. a mobile device). An example is the use of a PIN code entry to authorise a transaction. A common way to enter a PIN number is using a standard keypad 1700 as illustrated in FIG. 17. FIG. 17 shows a fixed keypad 1700 to enter a PIN code. Using this keypad 1700 for a given (fixed) PIN results in a sequence of user interactions (press/click locations) easily linked to the PIN. To address this problem various, there are various existing keyboard/keypad layout randomisation techniques, as briefly referenced in the Background section.

The number wheels examples described above may also be used for PIN entry. The number wheels implementations using stored video content (as per the method 200) have the benefit that a number on a wheel is related to a time offset in a video file. The initial wheel position and the time offset difference between number changes can be varied in the video content. This makes it possible to create different video files to enter a PIN which essentially randomise the user interactions and break any correlation between user interactions and the PIN. Similarly, the encoded video sections of the video content file may be permutated to provide further obfuscation to an attacker. This would require associated changes in the video playback control application.

The interaction modes for PIN entries can be adapted. The number wheel can be 'turned' by end-user interactions such as a 'swipe', a 'mouse drag', an up/down keyboard event, etc. The PIN entry position corresponds to a time offset in the video content, which can be linked to the PIN itself. In a protected software application, each time offset can be mapped to a transformed PIN using a Look Up Table or a function based on the time offset. There is also the option to add blank or dummy symbols.

Figure 18:
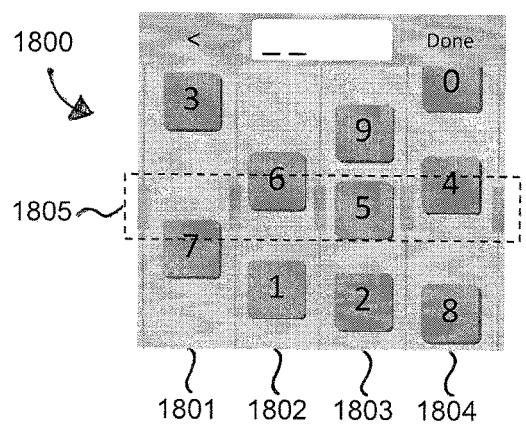
FIG. 18 schematically illustrates a GUI 1800 in which the numbers required for PIN entry are distributed over several wheels.

In a variant, all of the numbers required for PIN entry are distributed over several wheels as shown in the GUI 1800 of FIG. 18. A first wheel 1801 has the numbers '3' and '7', a second wheel 1802 has the numbers '1' and '6', a third wheel 1803 has the numbers '2', '5' and '9', and a fourth wheel 1804 has the numbers '0', '4' and '8' in the exemplary configuration shown in FIG. 18. Whilst four wheels are shown in FIG. 18, it will be appreciated that a different number of wheels could be used instead. The end-user may then rotate any wheel of the four to move a selected number to a central 'highlighted' position 1805 (as with normal number wheels), thereby selecting that number as part of the entered PIN. After each number selection, the displayed video content may reset to an arbitrary configuration with the numbers randomly distributed over the wheels. In this variant, the relevant properties of the detected user interaction are (a) the location of the user interaction (which is associated with the specific wheel being rotated), and (b) any movement (direction, speed, duration and/or length) associated with the user interaction (which defines how the specific wheel is being rotated). Thus, the selected wheel and the amount of rotation for that wheel correspond to a time offset in the video content, which in turn corresponds to a number value. In a variant, the wheels rotate and a user interaction stops the wheel to enter a number value. In this case, the relevant properties of the detected user interaction are (a) the location of the user interaction relative to the displayed video content (which is associated with the specific wheel being stopped), and (b) the timing of the detected using interaction relative to the displayed video content (which is associated with when the wheel is being stopped). The video time offset at the time of the user interaction determines the number value associated with the user input.

Figure 19:
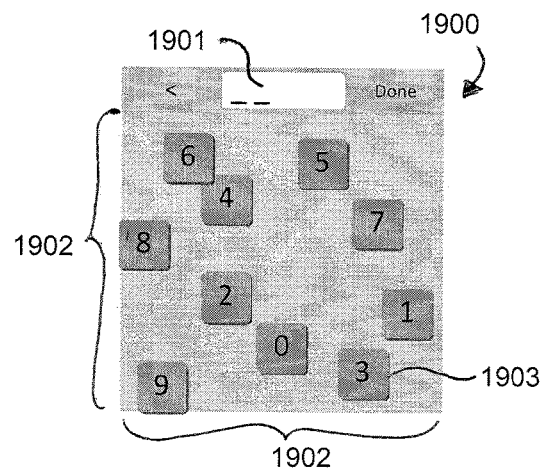
FIG. 19 schematically illustrates a GUI 1900 in which the numbers required for PIN entry follow two dimensional trajectories across the video window.

Rather than the numbers being confined to specific number wheels as in FIG. 18, a game-like variant allows the numbers to follow two dimensional trajectories across the video window, bouncing at the boundaries of the window as in the pioneering 'PONG' video game. An exemplary screenshot is shown in FIG. 19. FIG. 19 shows a snapshot of the PIN entry window 1900, where each number is associated with a number tile (such as the '3' number tile 1903). The number tiles move along a bouncing trajectory in a number tile area 1902. The number tiles may optionally interact with (e.g. bounce off) each other to avoid overlapping tiles. The user interaction involves the user tapping on a tiles to select that number and enter it into the number input field 1901. The number input field 1901 is distinct/separate from the number tile area 1902. As in previous examples, the time offset of the video at the time of the user interaction is an important factor in determining the number value. This offset is combined with the coordinates (i.e. location) of the user interaction in order to obtain the selected number associated with the user interaction. Thus, the relevant properties of the detected user interaction are the time and location of the user interaction relative to the displayed video content, which are uniquely associated with the specific number being selected by the user.

Another variant may also be illustrated with reference to the screenshot shown in FIG. 19. In this variant, the number tiles may be moved around the tile area 1902 by means of user interactions. In particular, the end-user may select a number by 'dragging' the associated number tile into the number input field 1901. The user can start a dragging gesture/motion on top of a number tile and end the dragging gesture in the general region of the number input field 1901. An acceptable number entry requires that the number tile is moved sufficiently close to the 'drop' zone as indicated by the number input field 1901. In FIG. 19, the number input field 1901 is shown near the top central location of the displayed video content window 1900, but this will be understood to be exemplary. Any other relative locations of the number entry field 1901 and the number tile area 1902 would be possible.

The initial location of the number tiles in the first portion of the video content may be variable (i.e. may vary between uses of the method 200) in any of the examples described above with reference to FIGS. 18 and 19. Thus, a particular user interaction is not uniquely associated with selection of a particular number tile—the displayed video content is also required to decipher which number has actually been selected. This is a key advantage over the fixed keypad configuration of FIG. 17.

Whilst the examples described above with reference to FIGS. 18 and 19 relate to entry of a 4-digit PIN number, it will be understood that these principles could also be applied to graphical element tiles other than just number tiles, thereby enabling entry of text fields, etc. by the user. Clearly text entry requires a larger number of graphical element tiles than the ten number tiles shown in FIGS. 18 and 19. The larger number of tiles may be considered to clutter the screen and complicate the entry of text, for example. Therefore, a variant may use a virtual keyboard or similar that moves across the screen (i.e. the virtual keyboard moves relative to the displayed video content window). The end-user may click on the location of a particular key of the virtual keyboard to select that key. Since the position of the virtual keyboard is a function of time, it complicates attacks that try to correlate input coordinates with the entered user input. The time varying element also can be applied to existing keypad transformations and virtual keyboard transformations such as briefly mentioned in the Background section.

In general, a software application contains code for the interaction with the end user. In GUI testing, it is possible to automate test generation. This same approach can be used to record the user action and the associated video. This can then be used to generate a video content file, the timing information for random video access points, and the associated sequence of triggers leading to the video. This means that these tools also can be adapted to prepare an encoded video content file containing all necessary graphical effects for an application. Thus, in one example, the video content is generated using GUI testing techniques. The main drawback of this approach is a rapidly increasing size of the necessary video content file. The following section demonstrates the problem of significant video file size increase for certain user interfaces, and how it can be solved by generating the video content in compressed video format in real time.

3—Using Video Content Generated in Real Time

Preliminary Discussion: Virtual Keyboard Example

Figure 9:
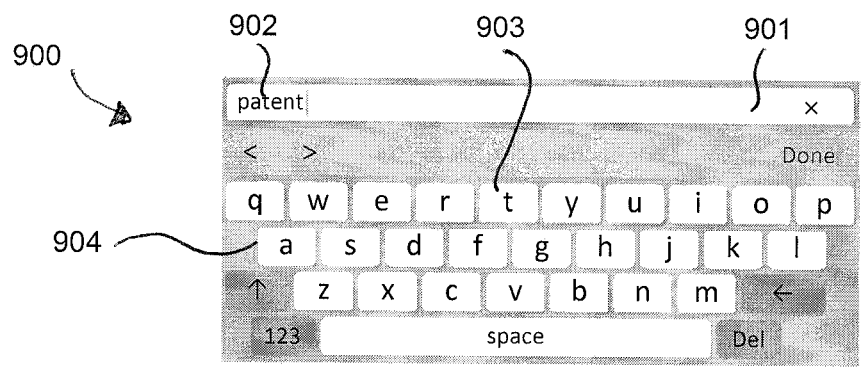
FIG. 9 schematically illustrates a virtual keyboard 900 for obtaining a user input.

As an example of a GUI for use in a method of obtaining a user input, consider a virtual keyboard for the user to provide a text input. An exemplary virtual keyboard 900 is shown in FIG. 9. The virtual keyboard 900 comprises a text input field 901 for displaying a text input string 902, as well as a plurality of virtual keys/buttons 904. The user can tap/press a chosen virtual key 904 to enter a corresponding graphical element into the text input field 901, thereby creating an text input string 902. For example, in FIG. 9, the user has most recently pressed the 't' key 903 of the virtual keyboard 900 such that a T has been entered in the text input field 901 at the end of the "patent" text input string 902. Thus, as the user types, an updated text input string 902 is displayed in the text input field 901 after each key press by the user. Other keys on the virtual keyboard (such as delete and backspace) have their usual effects.

The text input field 901 may display a reasonably sized string of characters (20-300 characters), and a character set may contain a substantial number of characters (100-1000 characters). Thus, in this case, it is not feasible to use the approach described above whereby video content is pre-generated and stored to enable playback of the appropriate GUI video for all possible user interactions. Pre-recording all video content for all possible user text inputs is just not a feasible approach; even for the lower bounds mentioned above, there are $20^{100}=10^{130}$ possible text input strings 902 which may be displayed in the text input field 901. Furthermore, in some variants, there could be animation which highlights the pressed virtual key 904 and/or increases the size of the pressed key 904 so as to provide additional user feedback. This could increase the required amount of pre-generated video content even further. Thus, the pre-recording approach adopted in the previously described character wheel examples is infeasible for this virtual keyboard GUI element.

Introduction to Generating Compressed Video

Figure 10:
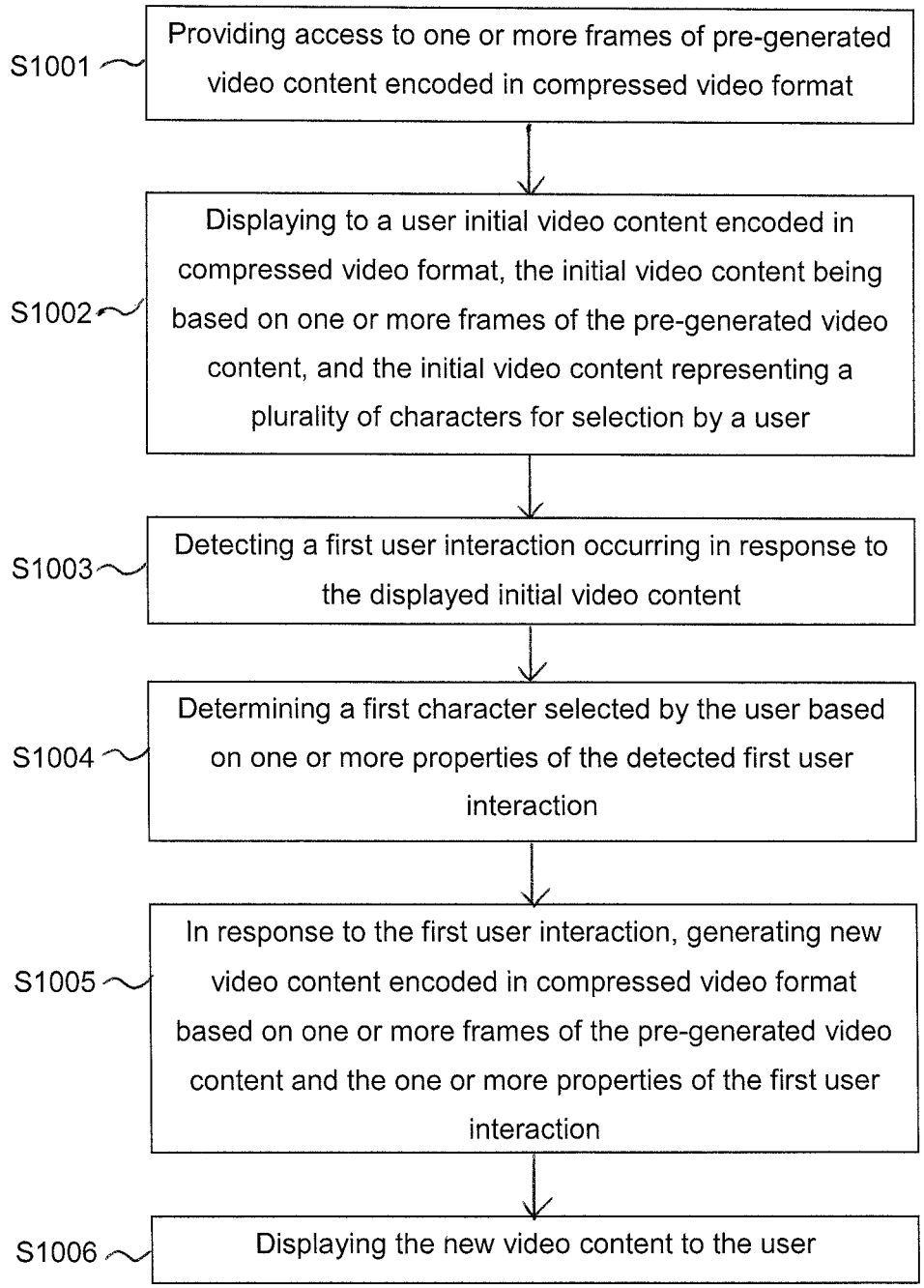
FIG. 10 schematically illustrates a computer-implemented method 1000 of obtaining a user input according to the second aspect of the present invention.

As shown in FIG. 10, there is provided a computer-implemented method 1000 of obtaining a user input. The method 1000 comprises, at step S1001, providing access to one or more frames of pre-generated video content encoded in compressed video format. At step S1002, the method 1000 further comprises displaying to a user initial video content encoded in compressed video format. There may be one or more frames of the initial video content. The initial video content is based on the pre-generated video content, and the initial video content represents a user interface including a plurality of graphical elements for selection by a user. At step S1003, the method 1000 further comprises detecting a first user interaction occurring in response to the displayed initial video content. At step S1004, the method 1000 further comprises determining a first graphical element (of the plurality of graphical elements) selected by the user based on one or more properties of the detected first user interaction. At step S1005, the method 1000 further comprises in response to the first user interaction, generating new video content encoded in compressed video format based on the pre-generated video content and the one or more properties of the first user interaction. At step S1006, the method 1000 further comprises displaying the new video content to the user.

Thus, rather than providing a very large pre-generated content file containing all potentially required video content (as in the method 200), the method 1000 generates encoded (i.e. compressed) video content in real time based on one or more pre-generated encoded video components (i.e. compressed). The real time generation of compressed video content does not simply involve screen grabbing the output of a traditional graphics implementation. Nor does it involve compressing uncompressed video content in real time. In contrast, the video content generation process references the pre-generated encoded video components (e.g. the references may be made using motion vectors). The pre-generated components usually include any sensitive image content (e.g. the virtual keyboard layout). Thus, in one example, the pre-generated video content is encrypted. The security requirements of some applications can be addressed by encrypting the pre-generated video components themselves, and allowing the references to the pre-generated video components to be unencrypted in the new video content. Thus, in one example, the new video content is not encrypted (i.e. the new video content is in cleartext).

The method steps of the method 1000 may be performed locally by a computer system such as the computer system 100. For example, the method steps may be stored as program code in a software application in the memory 106 of FIG. 1, executable via the processor 108. Furthermore, during execution of the software application, the video content may be displayed on the monitor 120, the first user interaction may be detected by means of the user input interface 114 (which is coupled to one or more user input devices 124, 126, etc.), and the determining and generating steps may be carried out by the processor 108. The method 1000 may be at least partially implemented at a server, in which case the video streamed to the user from the server depends on the user interaction properties that are sent to the server by a related software application on the client device. However, it is advantageous that the new video content generation step S1005 be performed locally on the device running the software application (e.g. computer system 100) so as to avoid delays associated with communicating with the server. Local video generation is discussed further in various examples that follow.

Types of Video Compression

In the broad range of video encoding standards (MPEG-1, MPEG-2, MPEG-4, H264, VP8, VP9), the common techniques used to achieve data compression are the removal of spatial redundancy (intra-frame compression) and the removal of temporal redundancy (inter-frame compression).

With regard to intra-frame compression, Discrete Cosine Transforms (DCTs) and information losing encoding of the DCT coefficients are used to remove the spatial redundancy in a single frame. This process reduces the number of bits needed to encode an image frame by a factor of 5-25. The resultant compressed frame is commonly called an I-frame (or intra frame).

With regard to inter-frame compression, instead of directly encoding the raw pixel values for each block (e.g. macroblock) in a given frame, an encoder will review a previously encoded frame and try to find a block similar to the one it is encoding in that given frame. The previously encoded frame is referred to as a reference frame. This process is done by a block matching algorithm. If the encoder succeeds in its search, the block may be encoded by a motion vector, which points to the position of the similar block in the reference frame. The process of motion vector determination is called motion estimation. In most cases the encoder will succeed in finding a similar, but not identical, block in the previously encoded frame. Thus, the encoder additionally computes the differences between the two blocks and records these residual values as the prediction error. Using both the motion vectors and the prediction errors, a decoder will be able to recover the raw pixels of the block. A frame compressed with reference only to earlier frames is commonly called a P-frame (or predicted frame). A frame compressed with reference to both earlier and later frames is commonly called a B-frame (or bidirectional frame). In order to further optimize the removal of temporal redundancy, later video compression standards feature more complex motion prediction schemes which extend the number of frames that can be referenced and which enable the coding of a common direction of motion for large areas in a frame.

The 'block' referred to above may, for example, be a macroblock. A macroblock is a processing unit in image and video compression formats based on linear block transforms, such as the discrete cosine transform (DCT). The terms 'block' and macroblock' may be used interchangeably herein.

Encoded frame types other than those discussed above are possible (e.g. MPEG-1 uses D-frames). Nonetheless, I-frames, P-frames and B-frames are the most common.

A Group of Pictures (GOP) defines the sequencing of the various frame types in encoded video content (e.g. IBBPBBPBBPBBI). In other words, a GOP structure specifies the order in which intra- and inter-frames are arranged. Later video encoding standards may use a more flexible sequencing structure.

Example of Generating Compressed Video

Motion vectors may be used to generate the new video content in step S1005 of the method 1000. In particular, generating the new video content in step S1005 may comprise generating motion compensated frames from one or more frames of the pre-generated video content. In one example, generating the motion compensated frames comprises generating pixel areas (e.g. macroblocks) encoded using motion vectors that reference pixel areas from one or more frames of the pre-generated video content. Pre-generated frames used in this way may be referred to as "reference frames". In one example, the motion vectors depend on the one or more properties of the first user interaction (e.g. the motion vectors of the new motion compensated frames may be related to the speed and direction of a user swipe on a touchscreen).

For example, the method 1000 may generate (macro) blocks encoded using motion vectors that reference one or more pre-generated I-frames from which the pixel areas are re-used. Advantageously, the method 1000 may be simplified by selecting/designing the GUI and the pre-generated I-frames such that no prediction errors are required. In other words, the motion-compensated frames may be generated exactly from the pre-generated I-frames using motion vectors alone.

The local generation of the new video content in the method 1000 replaces the use of entirely pre-generated content in the method 200. The new video content may be a file rendered into buffer memory. This can either be a segment of a large content file or a self-contained content file with a relatively short duration. The method 1000 may, for example, use 'play' and 'pause' to control the video rendering in response to an end user action. The 'skip' control is not is required in the method 1000 (cf. the method 200) as it is implemented by a locally generated video sequence. This provides a technical advantage as the method 1000 is able to use a very simple control API. The generation of the video content may involve generating a GOP structure and appending the pre-generated I-frame(s). The rendering may start at a time offset in the content that is locally generated in the end user device.

In one example, the step S1005 of generating new video content encoded in compressed video format involves generating a sequence of macroblocks. The encoded video creates a frame using a sequence of macroblocks (e.g. 16×16 pixel blocks) starting at the top left of the screen where each next macroblock describes the next pixel area in a left-to-right top-to-bottom sequence. An example of the invention uses a six macroblock subset of a larger frame. This subset of macroblocks is shown in FIG. 11 for two different frames of video content.

Figure 11:
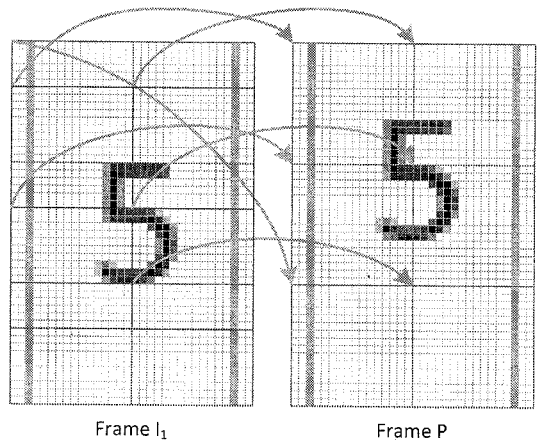
FIG. 11 schematically illustrates a subset of six macroblocks for two different frames of video content.

FIG. 11 schematically illustrates two video frames from a content file. An exemplary pre-generated frame $I_1$ is shown in its decoded form. The frame $I_1$ forms the basis for locally generating frame P using macroblocks containing motion vectors that reference pixel blocks from frame $I_1$. FIG. 11 also schematically illustrates the motion vectors used to create the macroblocks in the frame P. The local generation process involves constructing the motion vectors for the macroblocks in the frame P. In this case, there are no prediction errors. Thus, each motion vector effectively copies the pixel information from a pixel area in the frame $I_1$ to the frame P. FIG. 11 shows the frame P in decoded form after processing of the motion vectors which causes the number '5' to be moved upwards by 6 pixels. The construction method outlined in FIG. 11 can be applied to a sequence of multiple P-frames. With appropriate changes to the motion vectors it is possible to establish a variable upwards shift of the number '5'. Such a process can be used to cause the number to move upward or downward in the sequence of video frames. Such sequences can be used to create animations of a rotating number wheel. Thus, rather than providing access to a relatively large video content file in step S201 of the method 200, the method 1000 provides access to much smaller pre-generated frames in step S1001 and then locally generates the remaining content files in step S1005.

Rather than using only I-frames, a pre-generated P-frame also could be used as a reference frame, particularly for user interfaces where there is sufficient similarity between the two frames being 'merged' in a B-frame, as this may actually provide a size reduction. Thus, it will be understood that the pre-generated references frames could be any type of frames (in any video encoding construct, MPEG or otherwise) that can be referenced in a motion compensated encoding syntax structure.

Virtual Keyboard Example

The virtual keyboard example described above with reference to FIG. 9 can be implemented using B-frames in which macroblocks reference pixel areas from two I-frames $I_1$ and $I_2$. A simple example implementation is described below.

Figure 12A:
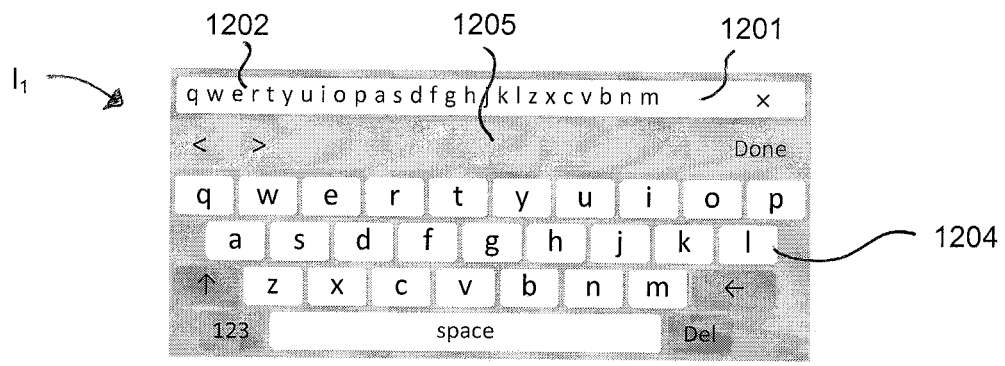
FIG. 12 schematically illustrates two exemplary pre-generated frames $I_1$ and $I_2$ for use in the method 1000.
Figure 12B:
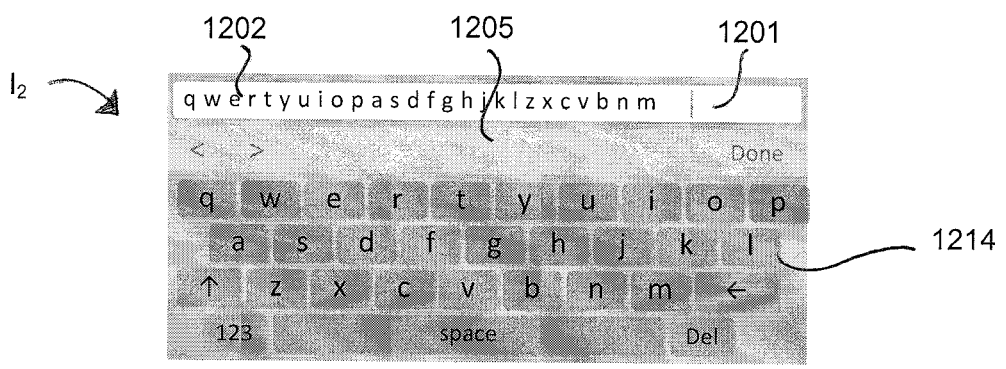

Two exemplary pre-generated frames $I_1$ and $I_2$ are shown in FIGS. 12A and 12B respectively. The first I-frame $I_1$ of FIG. 12A shows a virtual keyboard comprising a plurality of virtual keys/buttons 1204 for entering lower case characters, as well as a text input field 1201 displaying a text input string 1202. The text input string 1202 comprises each of the lower case characters from the plurality of virtual keys 1204. The second I-frame $I_2$ of FIG. 12B contains a slightly modified virtual keyboard. In particular, the second I-frame $I_2$ has the same text input field 1201 displaying the same text input string 1202 as the first I-frame $I_1$, but the plurality of virtual keys/buttons 1214 in the second I-frame $I_2$ have a different background colour.

In response to user interactions (i.e. as a user types on the virtual keyboard), the method 1000 is able to generate B-frames in step S1005 based on the two pre-generated I-frames $I_1$ and $I_2$. Each macroblock in a newly generated B-frame contains a motion vector that can reference a pixel area in either $I_1$ or $I_2$, or it contains two motion vectors that combine (add) pixel areas from both $I_1$ and $I_2$. It will be understood that a B-frame depicting the virtual keyboard 900 of FIG. 9 can be constructed by copying most of the pixel content from the I-frame $I_1$ using zero motion vector references. However, some non-zero motion vectors are required to generate the 'patent' text input string 902 in the text input field 901. Specifically, macroblocks comprising each of the letters 'p', 'a', 't', 'e', 'n', 't' from the text input string 1202 in the first I-frame $I_1$ will need to be copied sideways to formulate the 'patent text input string 902 of FIG. 9 at the appropriate location. For B-frames just following a user interaction, the application can generate macroblocks that copy pixel areas from the I-frame $I_2$ for the specific key which has just been pressed, thereby providing user feedback by highlighting just-pressed keys in a different colour.

In one example, the text in the text input string 1202 may use a font in which characters have different widths and/or a font that supports kerning. The page and paragraph style may require a variable letter spacing. One implementation of the method 1000 supports these features when the font size ensures that a macroblock of 16×16 pixels never contains pixels from more than two characters. This is valid for most fonts rendered for good readability on modern displays.

Figure 13:
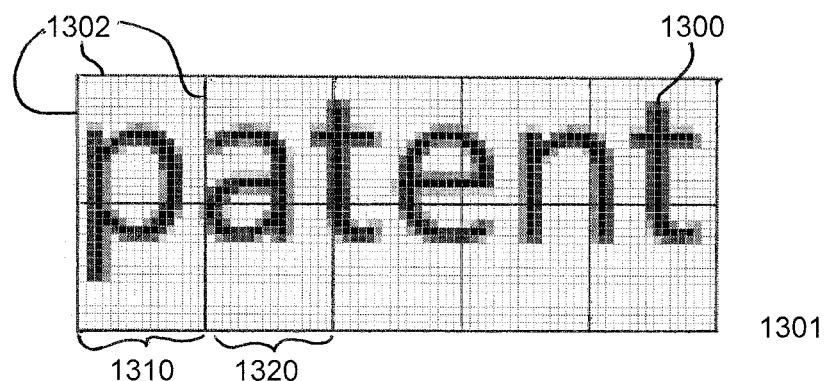
FIG. 13 schematically illustrates the string 'patent' 1300 rendered in Calibri font.

FIG. 13 shows the string 'patent' 1300 rendered in Calibri font. The gridlines 1301 depict individual pixels. The thicker gridlines 1302 depict the boundaries of 16×16 macroblocks. FIG. 13 shows that the bitmap of this rendered string has the property that each macroblock at most contains pixels from two characters. This means that the string can also be created by combining pixels areas from the two pre-generated I-frames $I_1$ and $I_2$ such that the two pre-generated pixel areas overlap. To support this overlap, there should be sufficient spacing (15 pixels in the background colour) between the characters in the text input strings 1202 in the first and second I-frames $I_1$ and $I_2$.

Figure 14:
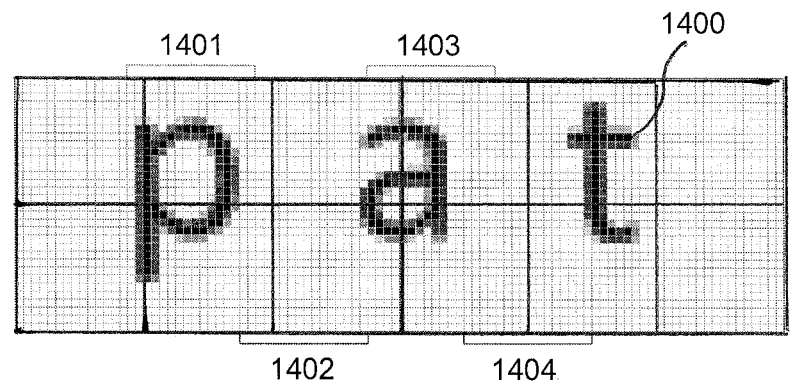
FIG. 14 schematically illustrates the first three characters 1400 of the 'patent' string as they might be shown in a text input string of the two pre-generated I-frames $I_1$ and $I_2$.

As an example, FIG. 14 shows as a subset the first three characters 1400 of the 'patent' string as they might be shown in the text input string 1202 of the two pre-generated I-frames $I_1$ and $I_2$. The spacing between each pair of characters is 15 pixels (macroblock size minus 1). FIG. 14 also shows the pixel columns (i.e. pixel areas) that are copied from the reference I-frames $I_1$ and $I_2$ to create the first few macroblocks shown in FIG. 13. For example, pixel columns 1401 and 1402 of FIG. 14 are copied and combined (i.e. overlapped) to form the two macroblocks 1310 of FIG. 13, and pixel columns 1403 and 1404 of FIG. 14 are copied and combined to form the two macroblocks 1320 of FIG. 13.

There may be rendering situations (such as the 'ate' in the FIG. 13 example), that result in a macroblock containing pixels from more than two characters. Such rendering situations require more than two combining motion vector references (e.g. as allowed in more advanced video encoding specifications). If only basic B-frame encoding can be used, additional pixel spacing is needed between the 'a', 't', 'e' characters for the rendering of the string 'ate'. As the rendered font size is increased, the probability of needing more than two combining motion vector references reduces very rapidly.

The simple example discussed in this section with reference to FIG. 12-14 is based on pre-generated reference I-frames that are fairly close to the layout of any intermediate frame that is to be newly generated. Implementation of a full virtual keyboard requires a larger set of characters (lower case, upper case, numbers and special characters), so it is necessary to create the required additional space in the reference frames for these additional characters. One space creating option uses knowledge of the virtual keyboard layout in order to generate the reference frames. For example, the blank bar 1205 between the text input field 1201 and the plurality of virtual keys/buttons 1204/1214 can be created by repeating a single blank macroblock. Similarly for the spacebar to a large extent. The keyboard buttons 1204/1214 also are a repetition of pixel blocks with space to include the relevant macroblocks to render a particular character. This results in reference frames that are substantially different from the layout of the generated intermediate B-frames.

The simple example discussed in this section may also be improved by using half pixel motion vector accuracy to more accurately control character spacing.

A similar methodology may be used to enable a user to control a computer game software application. For example, consider a computer game such as "PONG", which is a simple tennis-like game featuring two bats and a ball. Even for such a simple computer game, providing a pre-generated video content file including all possible results/outcomes of user interactions would lead to an extremely large video content file if using the method 200. However, such a game could be efficiently implemented with the method 1000 by using P-frames based on a single pre-generated I-frame. The pre-generated I-frame would include all game elements (background, bats and ball). The gameplay could be implemented by calculating motion vectors for the P-frames based on detected user interactions. In this way, appropriate video content could be displayed to the user.

Similarly, other GUI widgets could also be implemented using the method 1000, e.g. a computer menu (as described above with reference to the method 200).

In addition, it will be understood that an application could use a combination of pre-generated video (as per method 200) and real-time generated video (as per method 1000) to implement a user interface and thereby obtain a user input.

Number Wheel Example

The simple example described above with reference to FIG. 11 moves a rendered number '5' upwards in a user display. As well as being applicable to the virtual keyboard user interface, this concept may be extended to implement a user interface comprising a number wheel (or other graphical element wheel) for a user to provide a user input using the method 1000. An implementation of a full number wheel requires a pre-generated frame $I_1$ with macroblocks containing the relevant numbers/graphical elements. It also may be desirable to have additional macroblocks for construction of the wheel boundaries. Exemplary local generation of encoded video content is now described with reference to the PIN entry wheels example of FIG. 7.

Figure 15:
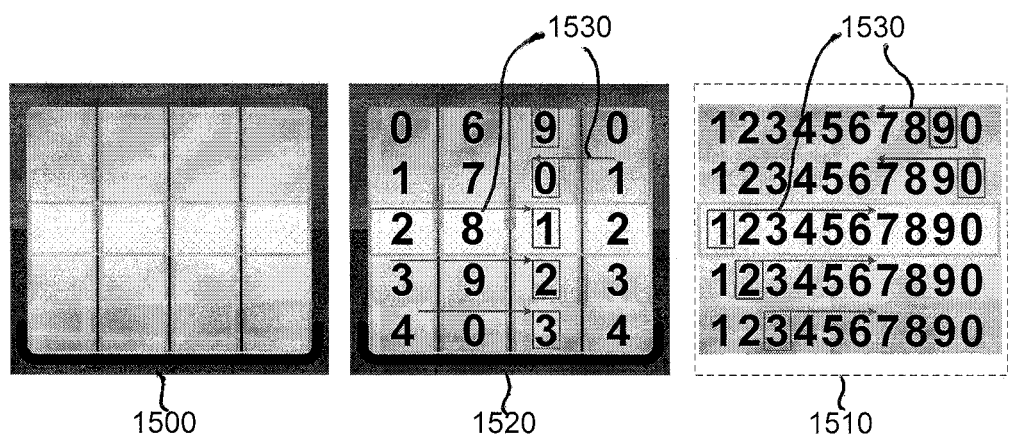
FIG. 15 schematically illustrates two pre-generated I-frames 1500 and 1510 on the left and right which may be used to construct a B-frame 1520 representing a PIN entry wheel configuration.

FIG. 15 schematically illustrates two pre-generated I-frames 1500 and 1510 on the left and right which may be used to construct a B-frame 1520 representing a PIN entry wheel configuration. The generated B-frame 1520 is shown in the centre of FIG. 15 between the two I-frames 1500 and 1510. The first I-frame 1500 includes only the PIN entry wheel borders and layout, with no numbers. The second I-frame 1510 shows only the numbers. The B-frame 1520 is generated by copying large portions of the first I-frame 1500 (including the borders and layout) using zero motion vector references to that frame. The relevant numbers from the second I-frame 1510 are then copied and overlaid onto the B-frame 1520 using suitable motion vectors. The motion vectors 1530 show where the numbers '90123' have been copied from in the second I-frame 1510. In FIG. 15, the motion vectors move the image areas in horizontal (sideways) directions only. This allows the background of the number from the second I-frame 1510 to precisely match the background of the destination area of the first I-frame 1500.

Figure 16:
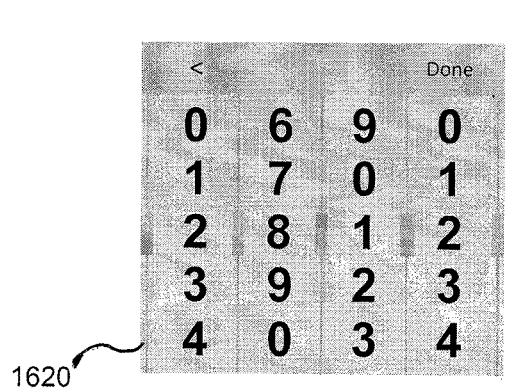
FIG. 16 schematically illustrates an alternative B-frame 1620 representing the same PIN entry wheel configuration as is shown in the B-frame 1520 of FIG. 15.

Implementing a vertical motion (e.g. to generate B-frames representing small upward or downward rotations of a number wheel) causes a background mismatch when using the pre-generated I-frames 1500 and 1510 shown in FIG. 15. The numbers on the central (highlighted) row would have the most noticeable background mismatch. This problem can be solved by adapting the background of the user graphics as shown in FIG. 16. In particular, FIG. 16 shows an alternative B-frame 1620 representing the same PIN entry wheel configuration as is shown in the B-frame 1520 of FIG. 15.

FIG. 16 has an even background, so a vertical move of a pixel area containing a number will not result in a background mismatch. Video window clipping can be used to partially display numbers near the top or the bottom of the screen during animation of a rotation.

If the video module used for playback supports more advanced video formats, the encoded video may reference additional I-frames (with vertically shifted numbers) or adopt encodings of transparent pixel values. The method 1000 may take advantage of such advanced video formats to support a wider range of user graphics and user interactions.

Initial Video Content

As discussed above with reference to the method 1000 of FIG. 10, initial video content encoded in compressed video format is displayed to the user in step S1002. The initial video content may comprise one or more frames. The initial video content is based on one or more frames of the pre-generated video content, and the initial video content represents a user interface including a plurality of graphical elements for selection by a user.

As an example, the initial video content may represent a keyboard comprising the plurality of graphical elements in the form of a plurality of characters (cf. the virtual keyboard 900 of FIG. 9). Alternatively, the initial video content may represent a wheel of graphical elements comprising the plurality of graphical elements (cf. number wheel 300 of FIG. 3, number wheels 700 of FIG. 7, number wheel 1520 of FIG. 15, or number wheel 1620 of FIG. 16).

In one example, the pre-generated video content (to which access is provided in step S1001) itself comprises the initial video content that is displayed to the user is step S1002. Thus, the pre-generated video content may comprise video generation content (used in step S1005) and the initial video content (used in step S1002). Usually, the video generation content will be different from the initial video content.

In a virtual keyboard example, the pre-generated content may comprise video generation content in the form of the two pre-generated I-frames I$_1$ and I$_2$ shown in FIGS. 12A and 12B that are used to generate the new video content in compressed video format in step S1005. The pre-generated content may further comprise the initial video content in the form of an I-frame which represents the initial virtual keyboard to be displayed to the user. For example, the initial virtual keyboard may be similar to the virtual keyboard 900 shown in FIG. 9 but without a text input string shown in the text input field 901. Rather than a single I-frame representing the initial virtual keyboard to be displayed to the user, it would be possible to have a plurality of frames of initial video content encoded in compressed video content to represent the initial keyboard layout (with a blank text input field 902) where a cursor is blinking at the start of the text input field 902. Clearly, other options would also be available for pre-generated initial video content.

In a number wheels example, the pre-generated content may comprise video generation content in the form of the two pre-generated I-frames 1500 and 1510 shown in FIG. 15 that are used to generate the new video content in compressed video format in step S1005. The pre-generated content may further comprise the initial video content in the form of an I-frame which represents the initial number wheels to be displayed to the user. For example, the initial number wheels may be similar to the number wheels 700 shown in FIG. 7. In another example, the wheels may be rotating in the initial video content. This would require multiple frames of initial video content.

Rather than pre-generating the initial video content, the initial video content may be generated (in real time) from the pre-generated video content. In this case, the pre-generated video content does not comprise the initial video content, but the initial video content is still based on the pre-generated video content. For example, generating the initial video content may comprise generating motion compensated frames from one or more frames of the pre-generated video content.

In the virtual keyboard example, frame(s) representing the initial keyboard layout could be generated as B-frames from the two pre-generated I-frames I$_1$ and I$_2$ shown in FIGS. 12A and 12B. Similarly, in the number wheel example, the initial number wheel could be generated from the two pre-generated I-frames 1500 and 1510 shown in FIG. 15. Real-time generation of the initial video content is particularly advantageous in the case of the number wheel example since it would be possible to provide a random initial number wheel (i.e. an initial number wheel showing a random initial PIN code) to make it even harder for an attacker to discern an entered PIN by monitoring user interactions. In another example, the wheel may be rotating in the initial video content. This would require multiple frames of initial video content.

User Interactions

In step S1003, the method 1000 comprises detecting a first user interaction occurring in response to the displayed initial video content. The step S103 may comprise detecting one or more properties of the first user interaction.

As for the method 200, the method 1000 is particularly suited to detecting user interactions via touchscreens (e.g. on mobile devices such as mobile telephones). However, all previously mentioned user interactions and properties thereof may be detected in step S1003 as for step S203.

In the virtual keyboard example, the first user interaction may comprise pressing, tapping, clicking, or otherwise selecting a particular one of the plurality of virtual key/buttons 904 of the displayed initial virtual keyboard. A defining property of the first user interaction is therefore the location of the press/tap/click/other relative to the displayed video content comprising the initial virtual keyboard. Thus, in this example, the location of the user interaction would be a property of the user interaction detected in step S1003.

In the number wheels example, the first user interaction may comprise a swipe upwards or downwards on a particular one of the number wheels initially displayed in step S1002 so as to move that number wheel to select a different number as being displayed (i.e. highlighted). (NB In this example, we will consider stationary initial number wheels, but it will be understood that the method 1000 is also applicable to moving initial number wheels). The detected properties of the first user interaction in this case are the location of the swipe (which may indicate which number wheel is to be moved), the direction of the swipe (upwards or downwards), the speed of the swipe (which may indicate a speed of movement of the wheel), and/or a length (in time, and/or in physical distance) of the swipe (which may indicate how far the wheel is to move). Thus, in this example, one or more of these properties of the user interaction would be detected in step S1003.

Having detecting the first user interaction (and any relevant properties) in step S1003, a first graphical element (of the plurality of graphical elements) selected by the user is determined in step S1004 based on one or more properties of the detected first user interaction.

In the simple virtual keyboard example where the graphical elements are characters, the location of the first user interaction (press/click/etc.) relative to the displayed video content (i.e. relative to the displayed virtual keyboard) will be uniquely associated with the first character selected by the user. In other words, a particular location is only associated with one character of the plurality of characters. Thus, in this case, there is a relatively simple mapping between the properties of the first user interaction and the first character selected by the user. Nonetheless, it will be understood that a plurality of locations of the first user interaction (all very close together) will be associated with the same character on the virtual keyboard. Thus, there is a many-to-one mapping from the first interaction locations to the associated characters.

In the number wheels example, the first number selected by the user may or may not be uniquely associated with the first user interaction.

Consider an example in which the initial video content is always the same (i.e. the number wheels always start at a particular configuration, such as the '2812' configuration shown in FIG. 7). In this example, a given user interaction (i.e. a given swipe) will be uniquely associated with a particular first number selected by the user (cf. the virtual keyboard example). However, a particular first number selected by the user will not be uniquely associated with a given user interaction. This is because there are many ways in which the user could swipe the first wheel to input a particular first number—it could be done slowly/quickly, the number wheel may be rotated upwards/downwards, the number wheel may go through less than or more than one full rotation, etc. In other words, in this example, there is a many-to-one mapping from the first user interaction to the first graphical element selected by the user.

Now consider an example in which the initial video content is variable. For example, the number wheels could start at the '2812' configuration shown in FIG. 7, or at any other initial configuration from '0000' through to '9999'. The number wheels need not even start with specific numbers already selected. For example, a wheel could start in a position between the '0' and the '1', or any other two adjacent numbers. In this case, a given user interaction (i.e. a given swipe) will not be uniquely associated with a particular first number selected by the user. The same small upward swipe may be associated with selection of a '4' given one starting configuration, and may be associated with selection of a '9' given another starting configuration. As for the previous examples, there may still be multiple swipes which lead to the same number selection. Thus, in this example, there is a many-to-many mapping from the first user interaction to the first graphical element selected by the user. This means that it is not possible for an attacker to reliably discern a number selected by the user by watching the user interactions alone. Knowledge of the displayed initial video content is also required (i.e. knowledge of the initial number configuration that the user is interacting with). Thus, in this example, determining the first graphical element selected by the user is further based on the displayed initial video content.

Chinese Text Input

The method 1000 may be used for a broader range on input methods, such as Chinese input methods (Pinyin, Cangjie). These input methods typically use a virtual keyboard to phonetically construct characters. The main challenge is that there are a very large number of such characters. A complete Chinese character set contains over 50,000 characters. A comprehensive modern dictionary will rarely list over 20,000 Chinese characters in actual use. An educated Chinese person will know about 8,000 characters, but knowledge of about 2,000 to 3,000 is sufficient for reading a newspaper. This means that for most applications, it will be sufficient to render around 3,000 to 5,000 different characters.

The rendering process for Chinese character typically involves associating a bitmap with each character in a font file. The character association for a font file usually is based on the Unicode standard. Assuming a bitmap size of 20×20 pixels, a high definition video frame (1920×1080 pixels) can contain around 96×54=5,184 characters, which would be sufficient for a fairly basic character input method. In more advanced video encoding specifications, a video frame can be constructed with references to multiple other video frames, rather than the two frames in MPEG2 B-frames.

An alternative rendering for Chinese characters might be based on Chinese character description languages. This process describes a character based on a set of strokes and basic components. Strokes are described as a scalable vector graphics or in a bitmap. Basic components are constructed from strokes only. This method uses approximately 100 strokes to construct a set of 1000 basic components to thereby generate tens of thousands Chinese characters. A 32×32 bitmap representation for the strokes and the basic components can be represented in a single high definition video frame. The alternative rendering of Chinese characters can be implemented with digital video primitives such as motion vectors if these basic shapes do not overlap and the video primitives support bitmap scaling.

There are a broad range of input methods for entering Chinese characters. The "pin yin" is a popular method that enables the user to enter the Characters using a (virtual) Latin character keyboard. After entering a pin yin string, the user is provided a set of Chinese character string alternatives that a user can select the desired character from. An example is shown in FIG. 20.

Figure 20:
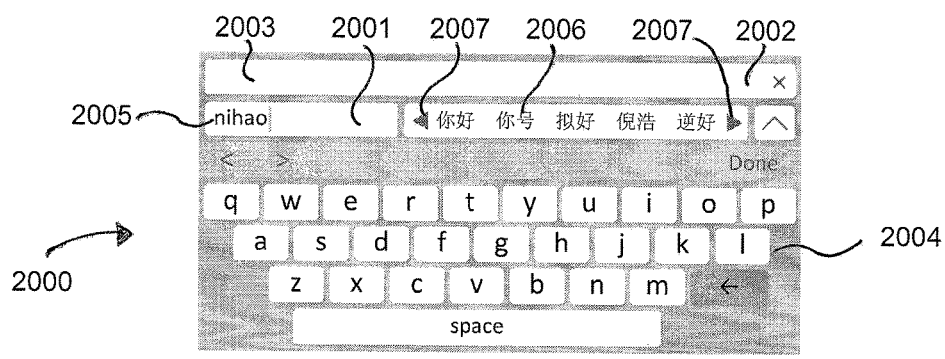
FIG. 20 schematically illustrates a virtual keyboard 2000 for entering Chinese characters using pin yin.

FIG. 20 shows an exemplary screen shot of a virtual keyboard 2000 for entering Chinese characters using pin yin. The virtual keyboard comprises a text input field 2001, a Chinese character selection field 2002, a Chinese character input field 2003, and a keyboard area 2004 comprising a plurality of Latin character keys. A pin yin string 'nihao' 2005 has been entered by a user using the Latin character keys and is displayed in the text input field 2001. The Chinese character selection field 2002 displays a number of Chinese characters 2006 based on the pin yin string 2005. These Chinese characters 2006 each represent a possible option for a Chinese character corresponding to the pin yin string 2005. The user can scroll through the Chinese characters 2006 in the Chinese character selection field 2002 using the scroll buttons 2007 so as to select a particular one of the Chinese characters that they wish to use. The selected Chinese character is then displayed in the Chinese character input field 2003. In FIG. 20, the user has yet to select a particular Chinese character from the Chinese character selection field 2002, so no corresponding Chinese character is displayed in the Chinese character input field 2003.

This user interface can be implemented using the method 1000. In this case, a first frame of pre-generated video content includes macroblocks for generating the virtual keyboard 2000 with empty fields 2001, 2002, and 2003. A second frame of pre-generated video content includes macroblocks for generating the Chinese characters and (optionally) the Latin characters. Any spare space in the first frame can also be used to store Chinese characters. All of the fields 2001, 2002 and 2003, and the keys in the keyboard area 2004, and the Chinese characters in the first and second frames share a common background to enable simpler implementation of the method 1000. In an advantageous example, all Chinese characters may be aligned on macroblock boundaries in the first and second frames such that there is no need to support proportional spacing. The first and second frames may be I-frames. In response to a user interaction, motion vectors may be used to generate new video content in compressed format based on the first and second frames and one or more properties of the user interaction.

For example, let us assume that the virtual keyboard configuration 2000 shown in FIG. 20 has been generated in the form of a B-frame using the first and second I-frames discussed above. In response to displaying the virtual keyboard configuration 2000 of FIG. 20, a user may press a scroll button 2007 so as to scroll the Chinese character selection field 2001 left or right. The location of the user interaction may be used to determine whether (and which) scroll button has been pressed. In order to generate the next B-frame, the software application may largely duplicate the motion vectors and frame references used in the B-frame 2000, but with slightly shifted motion vectors used to generate the Chinese character selection field 2002. Alternatively, in response to displaying the virtual keyboard configuration 2000 of FIG. 20, a user may select a particular one of the displayed Chinese characters 2006 so as to move that character to the Chinese character input field 2003. Such a user interaction may also clear the text input field 2001 and the Chinese character selection field 2002. In order to generate the next B-frame in this case, the software application may again largely duplicate the motion vectors and frame references used in the B-frame 2000. However, the motion vectors for the text input field 2001 and the Chinese character selection field 2002 would need to change so as to point to blank macroblocks in the pre-generated frames. Also, some of the motion vectors in the region of the Chinese character input field would need to point to the Selected Chinese character in either the first or second pre-generated frames. However, these motion vectors will already have been generated in the B-frame of FIG. 20 so as to display the relevant Chinese character in the Chinese character selection field 2002. Therefore, with knowledge of the intended look and functionality of the user interface, the motion vectors may be generated very efficiently in step S1005 of the method 1000.

In order to generate the exemplary B-frame shown in FIG. 20, the combining motion vectors are used to display the Latin characters in the text input field 2001 as for the previously described virtual keyboard examples (see FIGS. 9 and 12 and the associated description). The combining motion vectors are used to display the Chinese character bitmaps in the fields 2002 and 2003. However, there is not such a simple relationship between the user interactions and the Chinese character(s) to be displayed. With regard to the Latin text inputs, there is a clear relationship between the user interaction and the character to be displayed; specifically, the location of the user interaction is associated with a specific Latin character as displayed on the key of the virtual keyboard. In contrast, there are various 'pin yin' input methods that differ in how they determine the selection list of Chinese characters based on the pin yin string and the context of other Chinese characters. The input method also may learn from past selections, the user's writing style and from well-known phrases. As there is no 'standard' input method, end-users commonly install their own preferred input method. The method 1000 enables the implementation of any given input method. Thus, in one example, the method 1000 may initially comprise a step of receiving data indicative of a pin yin input method selected by a user. In response, the method may load the corresponding secured variant which maps between pin yin strings and Chinese characters. Based on this mapping, it will be possible to map Chinese characters from the first and second I-frames based on the input pin yin string.

4—Further Considerations

All of the examples discussed herein can be extended with options to deter shoulder surfing (see FIG. 8 and the associated description).

It will be understood that the method 200 can be implemented to include DRM-protection of the video content so long as the user device supports display of DRM-protected video content.

For some user interfaces, it may be desirable to prevent an attacker from viewing the video content displayed to the user during the methods 200 and 1000. In other words, in one example, the method steps S202, S1002 and S1006 involve secured display of the associated video content to the user. This makes it considerably harder for an attacker to access the displayed video content without physically seeing the content being displayed on screen. One way of accomplishing this is to activate the 'secure video path' protection provided by the DRM client implementation as described in PCT/EP2015/069294. In the method 1000, this would require the newly generated video content to be encrypted since the DRM client does not get activated to process unencrypted (cleartext) content. In the method 200 where the entire user graphics is pre-recorded, the entire video file(s) can be encrypted prior to delivery to the client device. Loading the encrypted video file(s) may then trigger the DRM client to obtain and process the relevant license and then decrypt the content and enforce the secure video path protection.

The method 1000 envisages user graphics implementations where a local application implementing the method 1000 locally encodes new video content based on the pre-generated video content. Encryption of the locally encoded frames of the video content (i.e. the new video content) would require local encryption of this material. This can be implemented using a white box implementation of the encryption algorithm. In some applications, the DRM client provider may not make the Content Encryption Key (CEK) available for such use. The method 1000 may circumvent this problem by only encrypting the pre-generated video content. The locally encoded frames of video (i.e. the new video content) may be provided unencrypted (i.e. in cleartext). This so-called 'partial encryption' may require signalling at the container level (MPEG 2, MPEG DASH) and may further require some adjustments to the encoded video (e.g. padding with dummy encoded video elements). The encryption of the pre-generated video content makes it very hard for an attacker to obtain the new video content as the motion-compensated (e.g. B- and P-) frames of the new video content only contain instructions to copy pixel areas from the encrypted pre-generated frames.

The PIN entry examples described above with reference to FIGS. 7-8, 15-16 and 18-19 enable the end-user to enter a PIN code by means of user interactions with the displayed video content. Some implementation techniques using encoded video content and controlling the video content playback have been described. An objective of these implementations is to obtain information from the end-user that is not accessible to an attacker. As described above, this may be achieved using the 'secure video path' technology provided by a DRM client and described in PCT/EP2015/069294. As the user input (i.e. the information being provided by the user) may be dependent both the user interaction and the displayed video content, an attacker needs access to both in order to mount a successful attack. The secure video path protection prevents an attacker from accessing the encoded video and the displayed video content, which protects the user input.

Determining the first graphical element selected by the user in steps S204 and S1004 (e.g. by processing the user interaction and the displayed video content) can be implemented in the server or locally in the end-user device. When implemented in the end-user device, steps S204 and S1004 may determine the first graphical element selected by the user in a white box attack scenario. The concept of a white box attack scenario is described in a paper by Chow et al. entitled "White-Box Cryptography and an AES Implementation" (available from https://www.cs.colorado.edu/~jr-black/class/csci7000/s03/project/oorschot-whitebox.pdf) and will be well understood by a skilled person. In a white box attack scenario, the code and data associated with steps S204 and S1004 are visible to an attacker for analysis/modification. Thus, the actual functionality of the code and its output need to be protected. This can be achieved using software obfuscation that changes the code to produce a transformed output. Since the inputs to the steps S204 and S1004 cannot be correlated to the user input (i.e. the graphical element selected by the user), and since the output of the steps S204 and S1004 is in the transformed domain, the user input is protected.

A key application for the methods 200 and 1000 described herein is to enable secure payments (e.g. by means of secure PIN entry). The non-repudiation aspects of this technique may be of interest. The methods described herein may also be useful to enable the secured entry of the transaction parameters (recipient account number, transaction amount and a transaction identifier) in a protected manner.

5—Implementation Modules and Interfaces

According to the method 200, the user graphics of a software application may be implemented using controlled playback of a video content file including the video content. The content file may be included in the data of the software application, or may be obtained from a server, or may be partially generated by the software application (as per the method 1000). An exemplary implementation 2200 is described below with reference to FIG. 22, which shows the software application 2201 for implementing operations that a user wants to perform.

Figure 22:
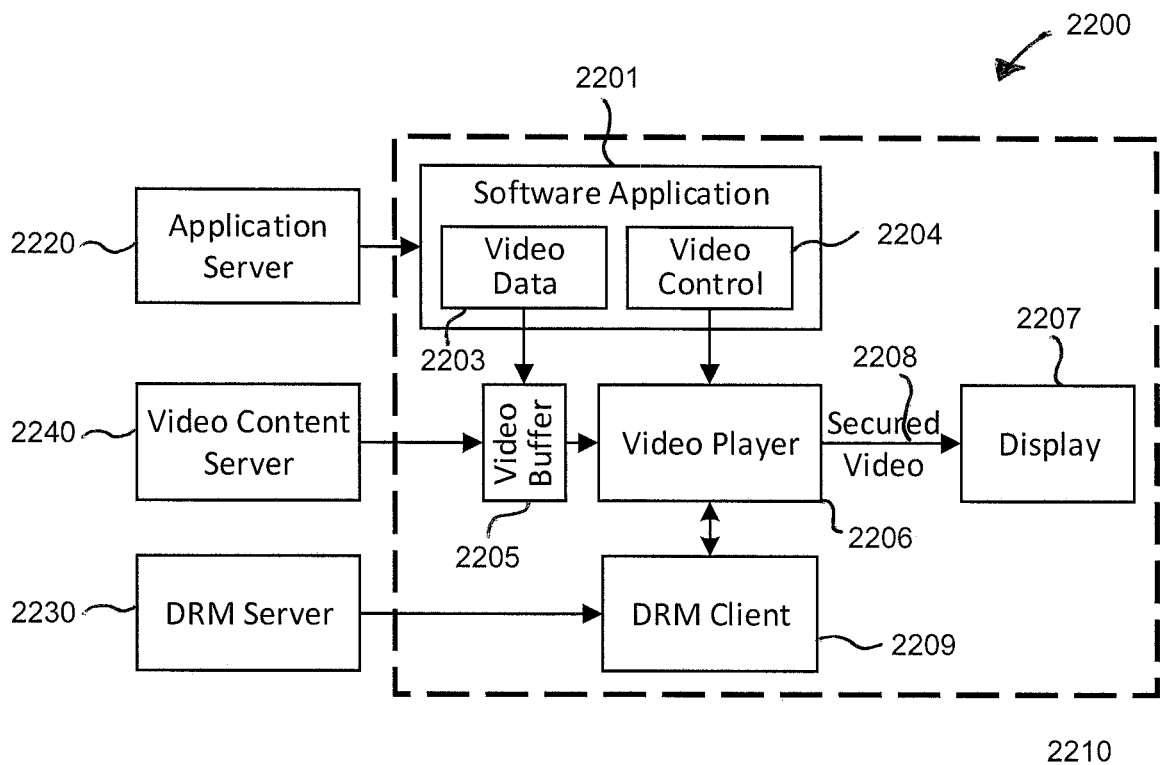
FIG. 22 schematically illustrates an exemplary implementation for the methodology described herein.

The software application 2201 is executing on a user device 2210. As shown in FIG. 22, the user device further includes a video buffer 2205, a video player 2206, a display 2207 and a DRM client 2209. The software application 2201 may optionally retrieve information from an application server 2220. The software application 2201 comprises two modules for implementing a graphical user interface, namely a video data module 2203 and a video control module 2204. The video data module 2203 of the software application 2201 is able to send data to the video buffer 2205 or to modify video data stored in the video buffer 2205. The video control module 2204 of the software application 2201 is configured to control the video player 2206. The video player 2206 is configured to receive data from the video buffer 2205 and to convert it into a format suitable for displaying on the display 2207. The display data may be provided using a secured video path 2208 if the DRM client 2209 of the device 2210 activates this protection feature. The DRM client 2209 may obtain relevant licenses (and associated content encryption keys) from a DRM server 2230. The video buffer may receiver video content from the software application 2201 or from a video content server 2240.

The video data module 2203 of the software application 2201 uses an interface to the video buffer 2205 and an interface (API) to control playback of content via the video player 2206. In one example, the software application 2201 may be a JavaScript application executing in a web browser. As previously described, the software application 2201 may obtain a video content file (or a subpart of the file) and send the video content to the video buffer 2205. In the case of a JavaScript application, the web browser provides the interface between the video data module 2203 of the JavaScript application and the video buffer 2205. The interface to the video buffer 2205 provides a mechanism to insert data into the content stream. The interface to the video player 2206 enables the operation of the video player by the software application 2201. Typical control operations are 'play', 'pause', 'skip', 'rate' and 'loop'. 'Play' starts the rendering operation of the video player 2206 at a particular time offset. 'Pause' halts the rendering operations (i.e. freezes the currently displayed video frame). 'Skip' jumps to an indicated time offset in the video content. 'Rate' sets the playback speed of the video content (faster or slower); a negative speed may indicate playback in reverse mode. 'Loop' continuously plays the video content between two indicated time offsets. These commands are examples and existing video control interfaces may provide a richer set of control operations. Nonetheless, it will be understood that the method 200 may be implemented even with a relatively basic video playback control interface. The software application 2201 can also benefit from API functionality to prevent or hide traditional user video control graphics from appearing on the display 2207. Functions of the software application 2201 may also be secured against reverse engineering. For web content this is described in PCT/EP2015/057044, for example.

An example implementation of the method 1000 may use HTML5 web content as the software application 2201 that generates the encoded video data for the video buffer 2205 and then uses the video control module 2204 to initiate playback on the video player 2206 to obtain the intended user graphics display. Compiled binary code could alternatively be used for the software application 2201.

6—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

What is claimed is:

1. A computer-implemented method of obtaining a user input, comprising:
   providing access to video content, the video content representing a user interface including a plurality of elements for selection by a user;
   playing a first portion of the video content to the user;
   detecting a first user interaction occurring in response to the played first portion of the video content; and
   determining a first element selected by the user based on one or more properties of the detected first user interaction;
   wherein the video content represents rotation of a wheel of graphical elements, the plurality of elements including the graphical elements.

2. The method of claim 1 wherein the graphical elements include one or more of: a character, a number, a letter, a symbol, a punctuation mark, a sign, a menu item, a button, a list box items, a spinner option, a drop down list item, a scrollbar item, a text box item, a virtual keyboard key, a computer game graphic, and/or another graphic.

3. The method of claim 1 wherein the one or more properties of the first user interaction comprise at least one of:
   a time of the user interaction;
   a location of the user interaction;
   a movement direction of the user interaction;
   a movement speed of the user interaction;
   a length in time of the user interaction;
   a physical length of the user interaction;
   a sound of the user interaction; and
   an identity of a sensor or input device used to detect the user interaction.

4. The method of claim 1 wherein the one or more properties of the first user interaction are uniquely associated with the first element.

5. The method of claim 1 wherein determining the first element selected by the user is further based on the played first portion of the video content, and wherein the one or more properties of the first user interaction and the played first portion of the video content are together uniquely associated with the first element.

6. The method of claim 1 wherein the video content includes I-frames and other frames, at least the I-frames being encrypted.

7. The method of claim 1 further comprising:
   in response to the first user interaction, playing a second portion of the video content to the user, the second portion of the video content being selected based on the one or more properties of the first user interaction.

8. The method of claim 1 wherein the first portion comprises a plurality of frames of the video content.

9. The method of claim 8 further comprising:
   pausing play of the first portion of the video content in response to the first user interaction.

10. A computer-implemented method of obtaining a user input, comprising:
    providing access to video content, the video content representing a user interface including a plurality of elements for selection by a user;
    playing a first portion of the video content to the user, wherein the first portion comprises a plurality of frames of the video content, and wherein the first portion of the video content represents rotation of multiple wheels of graphical elements, the plurality of elements including the graphical elements, wherein a location of the first user interaction is associated with a first wheel of the multiple wheels;
    detecting a first user interaction occurring in response to the played first portion of the video content;
    determining a first element selected by the user based on one or more properties of the detected first user interaction
    pausing play of the first portion of the video content in response to the first user interaction; and
    in response to the first user interaction, playing a second portion of the video content to the user, the second portion comprising a plurality of frames of the video content, wherein the first wheel is stationary in the second portion of the video content.

11. The method of claim 10 further comprising:
    detecting a second user interaction in response to the played second portion of the video content; and
    determining a second element selected by the user based on the played video content and one or more properties of the detected second user interaction; wherein a first video segment comprises the first portion of the video content and a second video segment comprises the second portion of the video content, the second video segment being selected from multiple second video segments, each of the second video segments representing rotation of all but one wheel of the multiple wheels with the one wheel being stationary, the selected second video segment being the one in which all but the first wheel of the multiple wheels are rotating and in which the first wheel is stationary.

12. The method of claim 11, wherein a location of the second user interaction is associated with a second wheel of the multiple wheels, the method further comprising:

in response to the second user interaction, playing a third portion of the video content to the user, the third portion comprising a plurality of frames of the video content, wherein the first and second wheels are stationary in the third portion of the video content; wherein a third video segment comprises the third portion of the video content, the third video segment being selected from multiple third video segments, each of the third video segments representing rotation of all but two wheels of the multiple wheels with the two wheels being stationary, the selected third video segment being the one in which all but the first and second wheels of the multiple wheels are rotating and in which the first and second wheels are stationary.

* * * * *